(12) United States Patent
Caswell

(10) Patent No.: US 12,092,174 B2
(45) Date of Patent: Sep. 17, 2024

(54) CENTRIFUGAL CLUTCH FOR A MUD MOTOR

(71) Applicant: Caswell, Inc., Lyons, NY (US)

(72) Inventor: Michael James Caswell, Fairport, NY (US)

(73) Assignee: Caswell, Inc., Lyons, NY (US)

( * ) Notice: Subject to any disclaimer, the term of this patent is extended or adjusted under 35 U.S.C. 154(b) by 0 days.

(21) Appl. No.: 18/310,124

(22) Filed: May 1, 2023

(65) Prior Publication Data

US 2023/0349429 A1 Nov. 2, 2023

Related U.S. Application Data

(60) Provisional application No. 63/337,431, filed on May 2, 2022.

(51) Int. Cl.
*F16D 43/18* (2006.01)
*F16D 43/14* (2006.01)

(52) U.S. Cl.
CPC ........ *F16D 43/18* (2013.01); *F16D 2043/145* (2013.01)

(58) Field of Classification Search
CPC .......... F16D 43/00; F16D 43/02; F16D 43/04; F16D 43/14; F16D 43/18; F16D 2043/145; B60K 17/02
See application file for complete search history.

(56) References Cited

U.S. PATENT DOCUMENTS

| | | | | |
|---|---|---|---|---|
| 547,930 | A * | 10/1895 | Marburg, Jr. | F16D 43/18 310/78 |
| 2,168,856 | A * | 8/1939 | Banker | F16D 43/18 192/75 |
| 3,188,995 | A * | 6/1965 | Barten | B63H 20/36 440/37 |
| 5,921,364 | A * | 7/1999 | Kobayashi | F16D 43/18 192/105 BA |
| 2003/0111315 | A1* | 6/2003 | Kramer | F16D 43/14 192/105 BA |

\* cited by examiner

*Primary Examiner* — Timothy Hannon
(74) *Attorney, Agent, or Firm* — Woods Oviatt Gilman LLP; Dennis B. Danella, Esq.

(57) ABSTRACT

A clutch assembly to adapt a clutch for use with a mud motor and a power take off (PTO) assembly is provided. The motor includes a body and a driving shaft, wherein the PTO assembly includes a PTO housing and a driven shaft. The clutch assembly includes a centrifugal clutch and a clutch housing. The clutch includes a hub that engages with the driving shaft, a shoe containing a plurality of fly-weights and an elastic member, and an outer drum casing adapted to selectively engage with the plurality of fly-weights when the rotational speed of the driving shaft is above a predetermined threshold. The clutch housing surrounds the centrifugal clutch and allows the clutch to be installed between the body of the motor and the PTO housing. The outer drum casing has a shaft fixed thereto that is adapted to engage with the driven shaft of the PTO assembly.

22 Claims, 26 Drawing Sheets

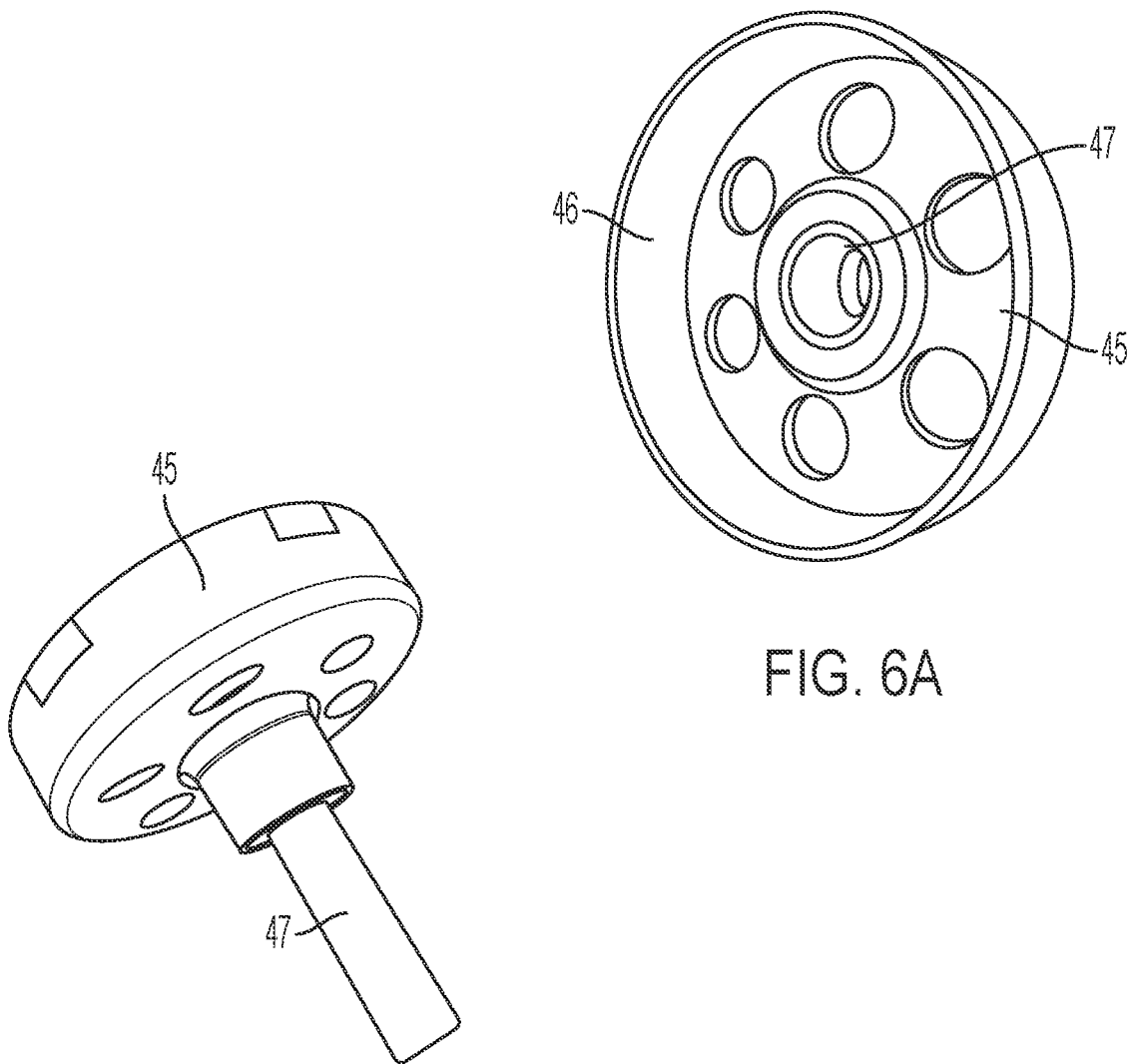
FIG. 6A
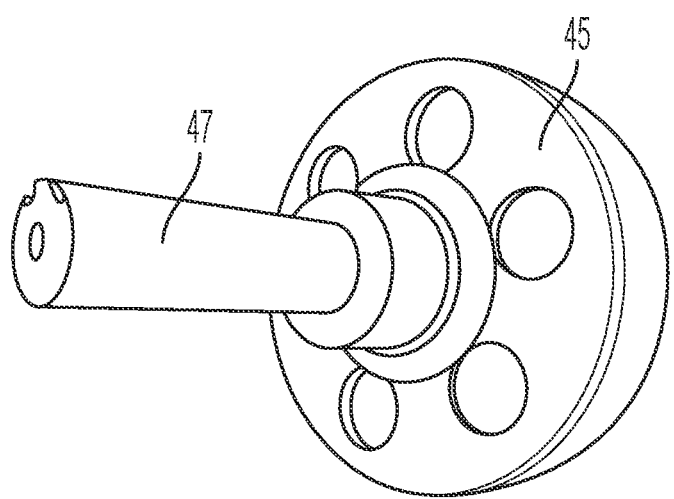
FIG. 6B
FIG. 6C

CENTRIFUGAL CLUTCH FOR A MUD MOTOR

CROSS REFERENCE TO RELATED APPLICATIONS

This application claims the benefit of U.S. Provisional Application No. 63/337,431 filed on May 2, 2022, which is incorporated by reference herein in its entirety.

FIELD OF THE INVENTION

The present invention is directed to a system for integrating a clutch for use with a mud motor. In particular, the present invention is directed to a system for integrating a clutch between a motor assembly and a power take off (PTO) assembly.

BACKGROUND OF THE INVENTION

Some currently available mud motors may have different shaft sizes, such as a ¾" diameter shaft for 3-7 hp motors, 1" diameter shafts for 8+hp motors, and ⅝" diameter shafts for low horsepower motors. With a mud motor, a mounting pattern around the drive shaft is either a 2.5" or 3.5" square of four mounting features that may take the form of apertures for receiving fasteners, such as bolt holes. Ordinarily, a power take off (PTO) propeller shaft, which also has the same mounting pattern/features, is fastened (e.g., bolted) directly to the motor body via the mounting pattern/features around the drive shaft.

Centrifugal clutches are often used in machines such as go-carts, where they are attached to a horizontal shaft engine, primarily to save the drivers (who are often children) from having to manually engage a clutch. Existing mud motors currently do not utilize a clutch, but it would be advantageous to install a clutch for use with a mud motor for several reasons that will be discussed further below.

To install a clutch on the mud motor, the clutch needs to be inserted between the motor body and the PTO housing. However, installing a conventional clutch onto a mud motor has a major problem, as the clutch is bigger than the mounting pattern/features in the motor body and the PTO housing. For example, a known clutch is typically larger (e.g., 4.5" diameter) than the pattern of mounting features on the motor body and the PTO housing (e.g., 2.5" or 3.5" diameter), such that the clutch would interfere with the fasteners used to attach the respective components of the clutch together with the motor body and the PTO housing. Modifications are required in order to make a centrifugal clutch suitable for use with mud motors.

Accordingly, there is a need for a mechanism that would allow a clutch, such as a centrifugal clutch, to be adapted for use with a mud motor and be installed between the motor body and the PTO propeller shaft, which both have mounting features that are smaller in diameter than the diameter of the clutch, without any interference when installing the fasteners to assemble the components together.

SUMMARY OF THE INVENTION

In order to address these and other needs, the present invention provides a centrifugal clutch for use with a mud motor and a PTO propeller shaft, along with various example embodiments of a clutch housing that allows the clutch to be installed between the mud motor and the PTO propeller shaft without interference from mounting patterns/features and corresponding fasteners.

According to an aspect of the present invention, the clutch itself has a female connector on the motor side, and a male shaft on the PTO side. The outer drum casing that fits over the rest of the clutch is modified to include a shaft having the same diameter and length as the driving shaft of the motor. The shaft on the outer drum casing may have different diameters and/or lengths, depending on the size or type of mud motor. A new clutch housing also provides a "step up-step down" method to get around the clutch.

An example clutch housing has a 2.5" or 3.5" mounting pattern (depending on size, type, or manufacturer or the motor, for example) on one side to fix to the motor body, and another 2.5" or 3.5" mounting pattern on the other side to fix to the PTO housing. Additionally, the clutch housing has a larger mounting pattern to fix components of the clutch housing itself together, while accommodating the bigger size of the clutch relative to the mounting patterns on the motor body and the PTO housing. This clutch housing also protects the operator of the motor from the spinning clutch.

One example embodiment utilizes a base plate and a cup for the clutch housing. Another example embodiment utilizes a pair of plates, along with spacer bolts and spacer tubes to attach and separate the plates, respectively, and an optional cover over the clutch and clutch housing.

Other variations are in the connectors on the engine shaft (driving shaft), on the PTO propeller shaft (driven shaft), and/or on the clutch itself. For example, keyed or slotted connectors (e.g., one point or two points) may be used in some mud motor assemblies (e.g., older models), whereas splined connectors (e.g., six points or ten points) may be used in some other mud motor assemblies (e.g., newer models). The connectors used may also vary depending on the size, type, or manufacturer of the motor, for example.

According to one aspect of the present invention, a clutch assembly configured to adapt a clutch for use with a mud motor and a power take off (PTO) assembly is provided, wherein the motor includes a body and a driving shaft, wherein the PTO assembly includes a PTO housing and a driven shaft. The clutch assembly includes a centrifugal clutch including a hub configured to engage with the driving shaft of the motor, a shoe containing a plurality of fly-weights and an elastic member coupled with the plurality of fly-weights, and an outer drum casing adapted to selectively engage with the plurality of fly-weights when the driving shaft rotates at a first speed above a predetermined threshold. The clutch assembly further includes a clutch housing configured to surround the centrifugal clutch and configured to be mounted to the body of the motor and the PTO housing.

According to another aspect, the outer drum casing has a shaft fixed thereto that is adapted to engage with the driven shaft of the PTO assembly.

According to another aspect, the clutch housing includes a base plate having inner mounting features that are radially disposed at a first distance from a longitudinal axis of the driving shaft of the motor, and outer mounting features that are radially disposed at a second distance from the longitudinal axis of the driving shaft of the motor, where the second distance is greater than the first distance. The clutch housing further includes a cup having inner mounting features on a PTO-facing side of the cup and outer mounting features on a motor-facing side of the cup. The base plate is attachable to the body of the motor using inner mounting features of the base plate and corresponding fasteners. The cup is attachable to the base plate using the outer mounting features of the base plate and the outer mounting features on the motor-facing side of the cup and corresponding fasteners. The cup is attachable to the PTO housing using the inner mounting features on the PTO-facing side of the cup. The cup is adapted to be disposed around the centrifugal clutch when installed.

According to another aspect, the clutch housing includes a first plate having inner mounting features that are radially disposed at a first distance from a longitudinal axis of the driving shaft of the motor, and outer mounting features that are radially disposed at a second distance from the longitudinal axis of the driving shaft of the motor, where the second distance is greater than the first distance, a second plate having inner mounting features and outer mounting features, and elongated spacer bolts adapted to attach the first plate and the second plate, and spacer tubes adapted to slide over the spacer bolts and separate the first plate and the second plate. The first plate is attachable to the body of the motor using the inner mounting features of the first plate and corresponding fasteners. The second plate is attachable to the PTO housing using the inner mounting features of the second plate and corresponding fasteners. The second plate is attachable to the first plate using the respective outer mounting features, the elongated spacer bolts, and the spacer tubes which are inserted onto the elongated spacer bolts between the first plate and the second plate to separate the second plate from the first plate and secure the first plate, the spacer tubes, and the second plate together.

According to another aspect, the clutch housing further includes a cover configured to surround the centrifugal clutch within the clutch housing, wherein the cover is adapted to wrap around the spacer tubes and be secured between the first plate and the second plate when installed. In some example embodiments, the cover is a snap-on or clip-on type plastic safety cover having a width corresponding to a length of the spacer tubes, a curvature corresponding to a curvature of the outer drum casing of the clutch, one open side adapted for installing the cover, and detents that align with the outer mounting pattern of the first and second plates and are adapted to engage with the spacer tubes, respectively, when the cover is installed.

According to another aspect, in a case where the motor is a 1-3 hp motor, the driving shaft of the motor has a 5/8" diameter, in a case where the motor is a 3-7 hp motor, the driving shaft of the motor has a 3/4" diameter, or in a case wherein the motor is an 8+hp motor, the driving shaft of the motor has a 1" diameter. The shaft fixed to the outer drum casing of the clutch has a diameter corresponding to the driving shaft of the motor.

According to another aspect, a mounting pattern around the driving shaft on the body of the motor is a 2.5" or 3.5" square of a plurality of apertures for receiving corresponding fasteners, and a mounting pattern around the driven shaft of the PTO housing is a 2.5" or 3.5" square of a plurality of apertures for receiving corresponding fasteners. The centrifugal clutch and the clutch housing are installed between the body of the motor and the PTO housing, and wherein the outer drum casing of the clutch has a 4.5" diameter, which is larger than the mounting patterns on both the body of the motor and the PTO housing, respectively. An inner mounting pattern on a motor side of the clutch housing is a 2.5" or 3.5" square of a plurality of apertures corresponding to the mounting pattern around the driving shaft of the motor, and an inner mounting pattern on a PTO side of the clutch housing is a 2.5" or 3.5" square of a plurality of apertures corresponding to the mounting pattern around the driven shaft of the PTO housing.

According to another aspect, the centrifugal clutch utilizes keyed or slotted connectors for the shaft of the outer drum casing when the motor is a first size or type of mud motor, or utilizes splined connectors for the shaft of the outer drum casing when the motor is a second size or type of mud motor that is different from the first size or type of mud motor.

According to another aspect, the plurality of fly-weights are adapted to engage with an inner surface of the outer drum casing, and the shaft of the outer drum casing is adapted to rotate the driven shaft of the PTO assembly, when the driving shaft rotates at the first speed above a predetermined threshold. The plurality of fly-weights are adapted to disengage with the inner surface of the outer drum casing, and the shaft of the outer drum casing is adapted to stop rotating the driven shaft of the PTO assembly, when the driving shaft rotates at a second speed that is below the predetermined threshold. The centrifugal clutch allows a propeller attached to the driven shaft of the PTO assembly to remain stationary while the motor is running at the second speed.

According to yet another aspect of the present invention, a system for integrating a clutch for use with a mud motor is provided. The system includes a motor assembly including a body, a driving shaft, and mounting features disposed at a first radial distance from a longitudinal axis of the driving shaft, and a power take off (PTO) assembly including a PTO housing, a driven shaft, and mounting features disposed at the first radial distance from the longitudinal axis of the driving shaft. The system further includes a clutch assembly adapted for installation between the motor assembly and the PTO assembly, wherein the clutch assembly includes a centrifugal clutch including a hub that is adapted to engage with the driving shaft of the motor assembly, a shoe containing a plurality of fly-weights and an elastic member coupled to the plurality of fly-weights, and an outer drum casing that is adapted to selectively engage with the plurality of fly-weights when the driving shaft is rotated at a first speed above a predetermined threshold, and a clutch housing configured to surround the centrifugal clutch and allow the clutch to be installed between the body of the motor and the PTO housing.

According to another aspect, the outer drum casing of the clutch assembly has a shaft fixed thereto that is adapted to engage with the driven shaft of the PTO assembly.

According to another aspect, the clutch housing includes a base plate with inner mounting features disposed at the first radial distance from the longitudinal axis of the driving shaft for attachment to the motor body and outer mounting features disposed at a second radial distance from the longitudinal axis of the driving shaft that is greater than the first radial distance. The clutch housing further includes a cup with the inner mounting features having the first radial distance at a first end for attachment to the PTO housing and the outer mounting features having the second radial distance at a second end, wherein the cup and the base plate are attached together using the outer mounting features.

According to another aspect, the clutch housing includes a first plate and a second plate, wherein the first and second plates both include inner mounting features disposed at the first radial distance from the longitudinal axis of the driving shaft for attachment to the motor body and the PTO housing, respectively, and outer mounting features disposed at a second radial distance from the longitudinal axis of the driving shaft that is greater than the first radial distance for attachment of the first and second plates via spacer bolts to secure together and separate the first and second plates.

According to another aspect, the shaft fixed to the outer drum casing of the clutch assembly has a same size, length, diameter, and/or connector type as the driving shaft of the motor assembly.

According to another aspect, the outer drum casing of the clutch has a radius that is greater than the first radial distance of the mounting features of the motor assembly and the PTO assembly.

Additional benefits of the above-described system for integrating a clutch with a mud motor are set forth in the following discussion.

BRIEF DESCRIPTION OF THE DRAWINGS

The above-mentioned and other features and advantages of this invention, and the manner of attaining them, will become apparent and be better understood by reference to the following description of the invention in conjunctions with the accompanying drawings, wherein:

FIGS. 6A-6C show various views of the outer drum casing of the clutch of FIGS. 3A-3C, which includes an inner surface and a shaft fixed thereto;

DETAILED DESCRIPTION OF THE INVENTION

Figure 1A:
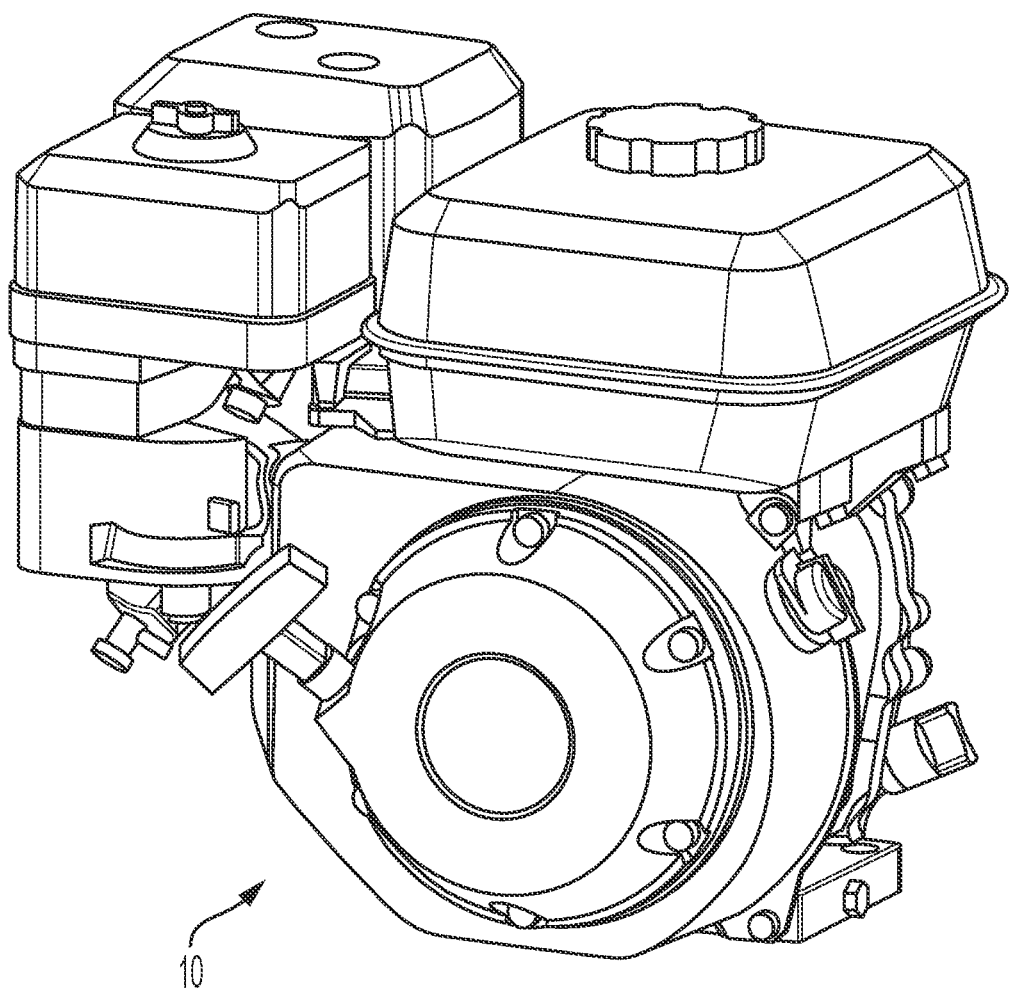
FIG. 1A shows an example mud motor.

Referring to the drawings in detail, an aspect of the present invention includes a system for integrating a centrifugal clutch for use with a mud motor. Other aspects of the present invention will be discussed in more detail below.

Figure 1B:
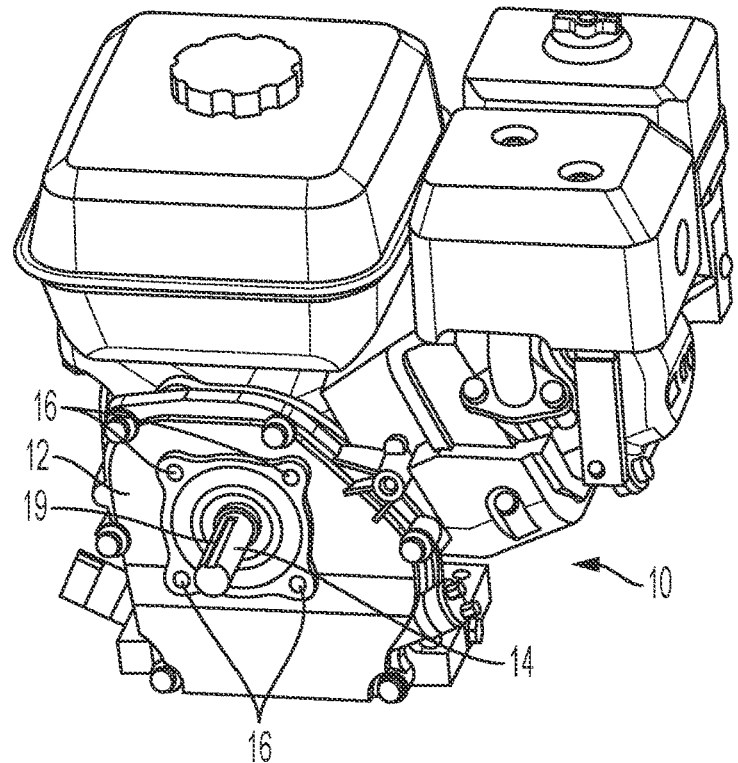
FIGS. 1B and 1C show perspective views of a body, a driving shaft, and mounting pattern/features of the mud motor as shown in FIG. 1A.
Figure 1C:
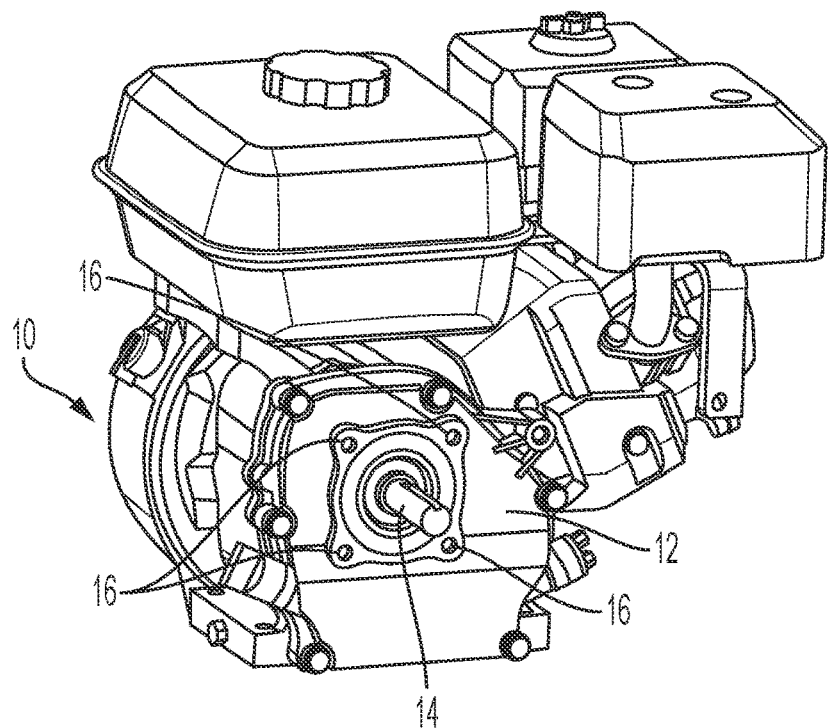

FIG. 1A shows an example mud motor 10 that may be used in association with the present invention. FIGS. 1B and 1C show perspective views of a body 12, a driving shaft 14, and mounting pattern/features 16 of mud motor 10. Although a keyed connector 19 (e.g., one point) is shown on driving shaft 14 in the non-limiting example embodiment of FIGS. 1B and 1C, it should be appreciated that a slotted connector (e.g., two points)(FIG. 3F) or a splined connector (e.g., six points, ten points)(FIG. 3G) could similarly be used according to some other example embodiments.

Figure 2A:
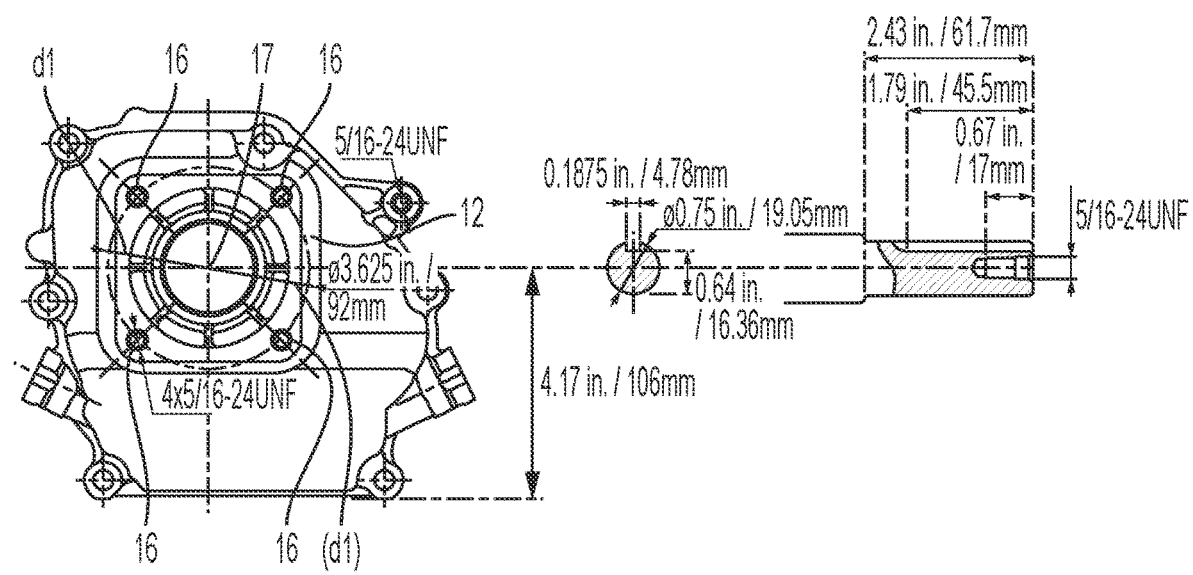
FIG. 2A is a power take-off diagram showing the mounting pattern/features on the body of the motor, wherein the dimensions included therein are merely exemplary and are not meant to be limiting.

FIG. 2A is a power take-off diagram showing mounting pattern/features 16 on body 12 of motor 10. Mounting pattern/features 16 are radially disposed a first distance (d1) from a longitudinal axis 17 of driving shaft 14 of motor 10. Ordinarily, mounting pattern/features 16 of motor body 12 are used to attach a PTO housing directly to body 12 of motor 10. However, according to aspects of the present invention, mounting pattern/features 16 will be used to attach a clutch housing to body 12 of motor 10.

Figure 2B:
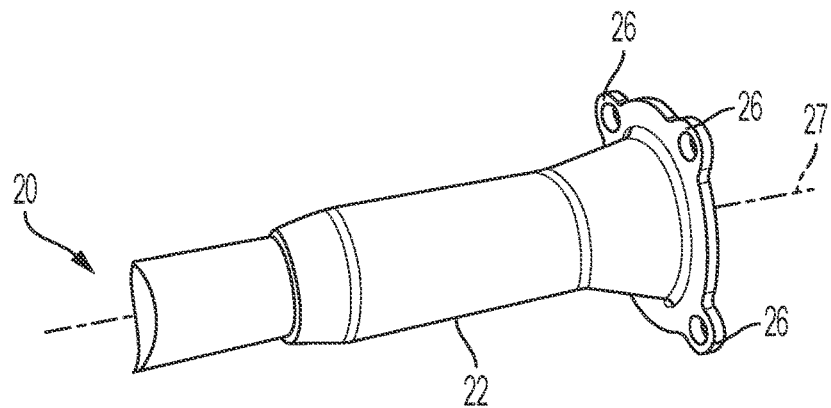
FIG. 2B shows an example of a power take off (PTO) housing for use with a mud motor, wherein the PTO housing includes a mounting pattern/features at one end (motor side)
Figure 10A:
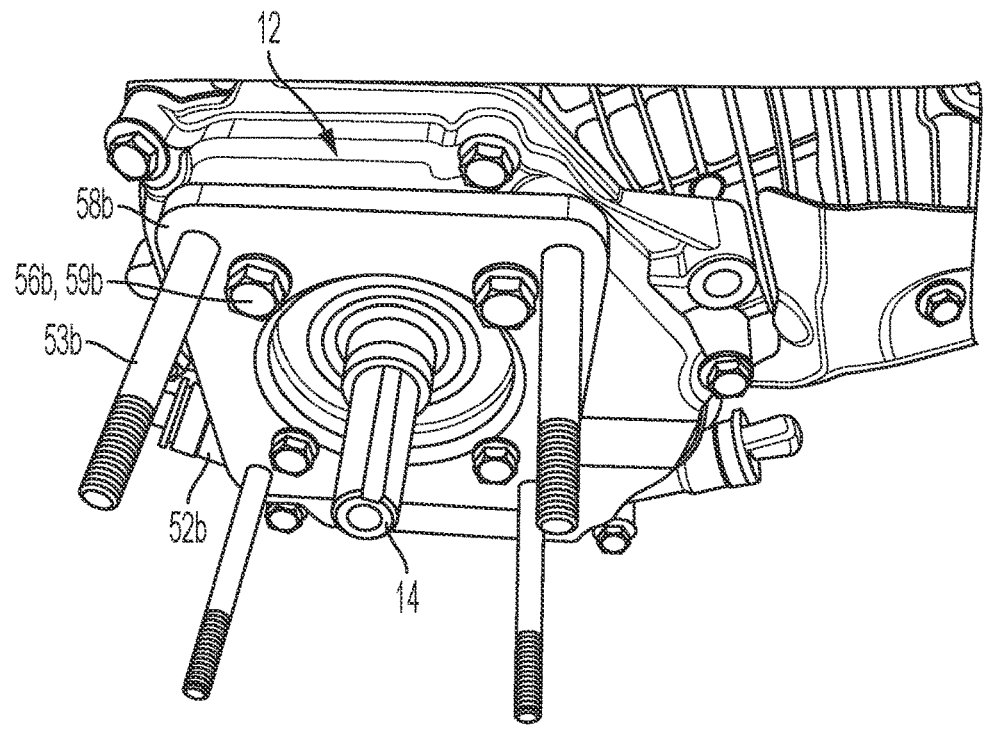
FIGS. 10A-10G illustrate installation of the clutch assembly shown in FIG. 9A, including the centrifugal clutch and the clutch housing, between the motor body and the PTO housing.
Figure 10B:
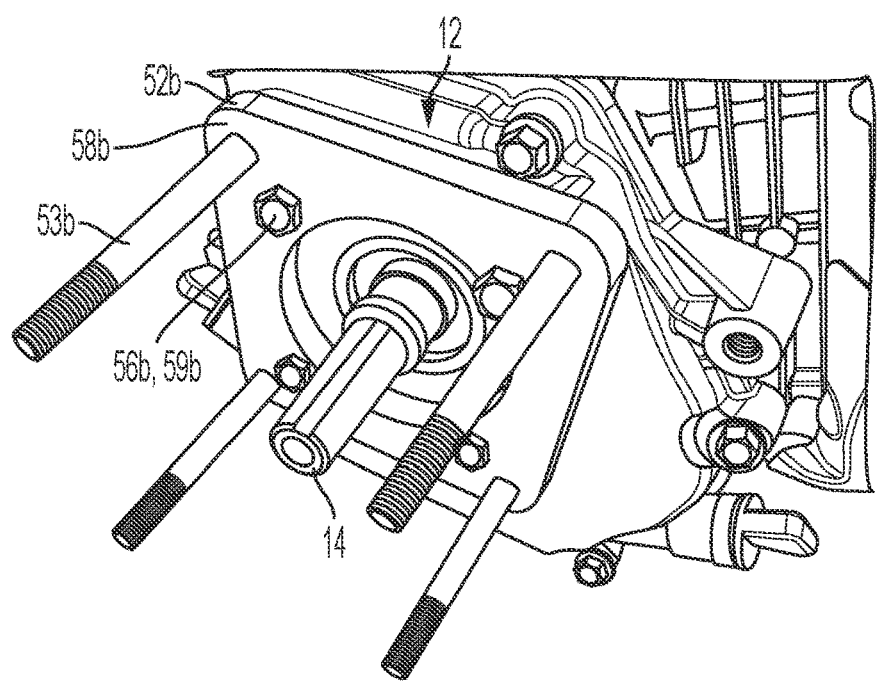
Figure 10C:
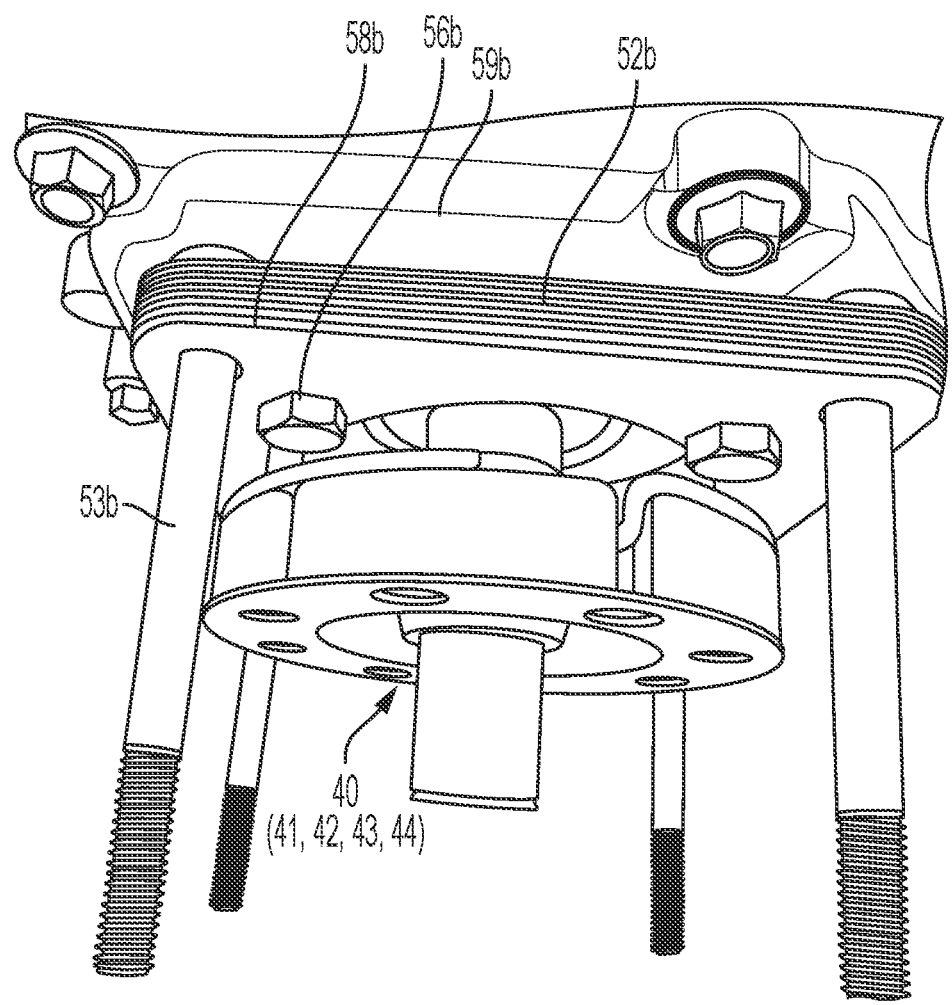
Figure 10D:
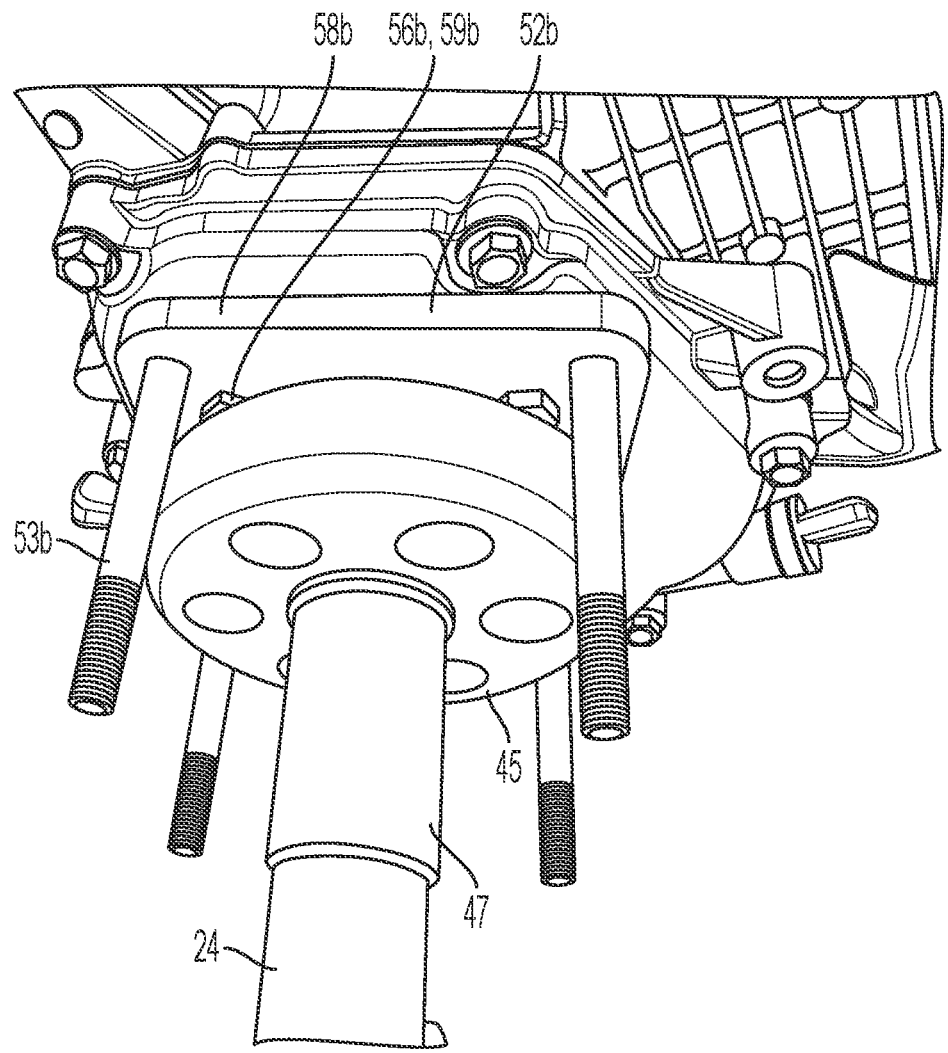
Figure 10E:
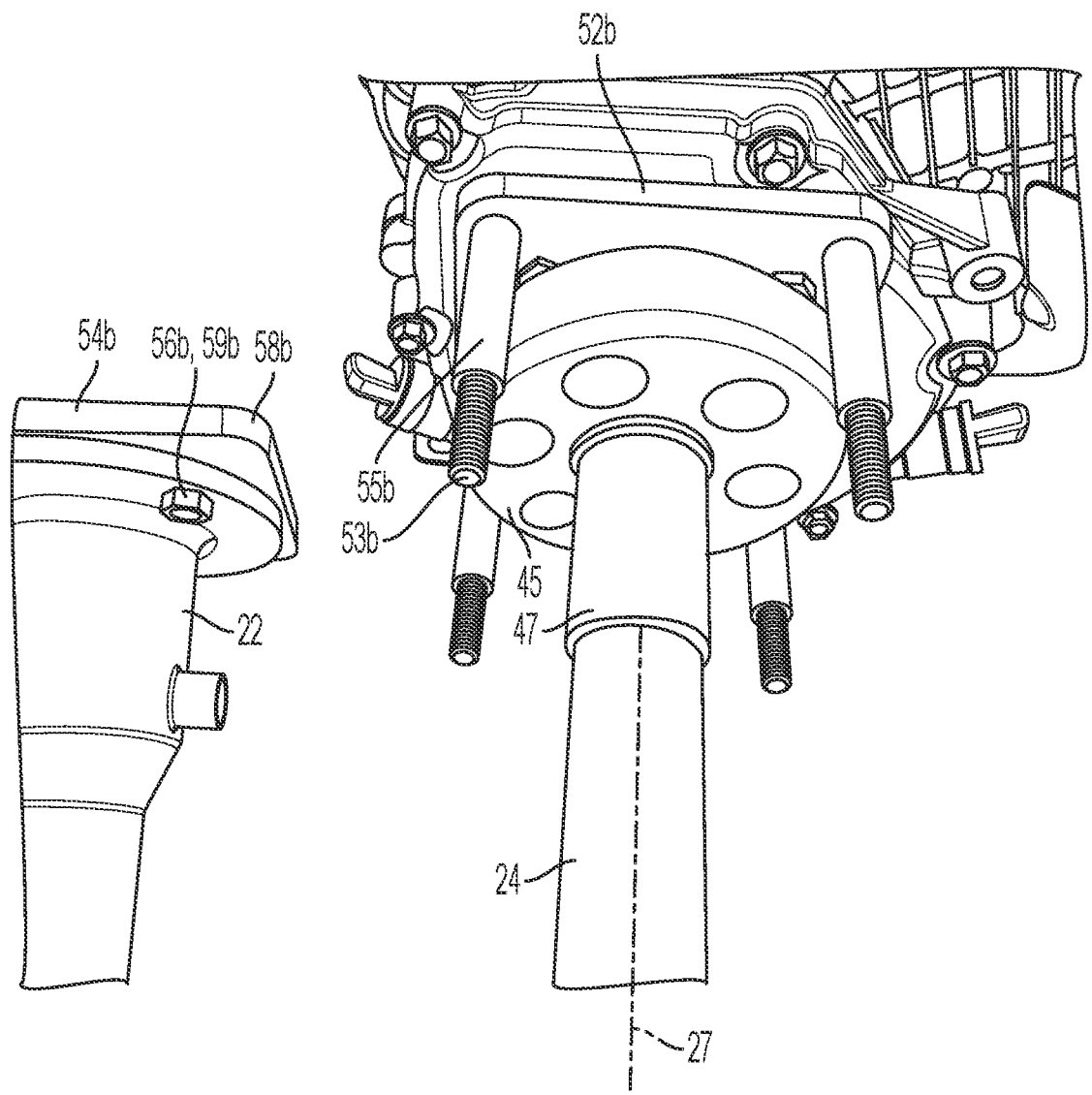

FIG. 2B shows an example of a power take off (PTO) 20 including a PTO housing 22 for use with mud motor 10 (e.g., a Chinese Twister), wherein PTO housing 22 includes a mounting pattern/features 26 at one end (motor side). With additional reference to FIG. 2A, mounting pattern/features 26 are radially disposed at first distance (d1) from a longitudinal axis 27 of a driven shaft 24 (e.g., FIG. 10E) of PTO 20, which may be collinear with driving shaft 14 of motor 10. Driven shaft 24 may also use different types of connectors (e.g., keyed, slotted, splined). Ordinarily, mounting pattern/features 26 of PTO housing 22 is used to attach PTO housing 22 directly to body 12 of motor 10. However, according to aspects of the present invention, mounting pattern/features 26 will be used to attach PTO housing 22 to clutch housing 50a, 50b (FIGS. 4A, 10F) attached to body 12 of motor 10.

As mentioned above, it would be advantageous to provide a mechanism for a safety clutch to be adapted for use with motor assembly 10 and PTO assembly 20. Clutch assembly 30a, 30b (FIGS. 4A and 10F) according to example embodiments described herein, which include a centrifugal clutch 40 (FIG. 3A) and a clutch housing 50a, 50b (FIGS. 4A, 10F), respectively, has been designed to address these and other needs. Several advantages of integrating a clutch with a mud motor and PTO housing will first be described below, followed by a more detailed description of the various components of clutch assembly 30a, 30b.

Figure 4A:
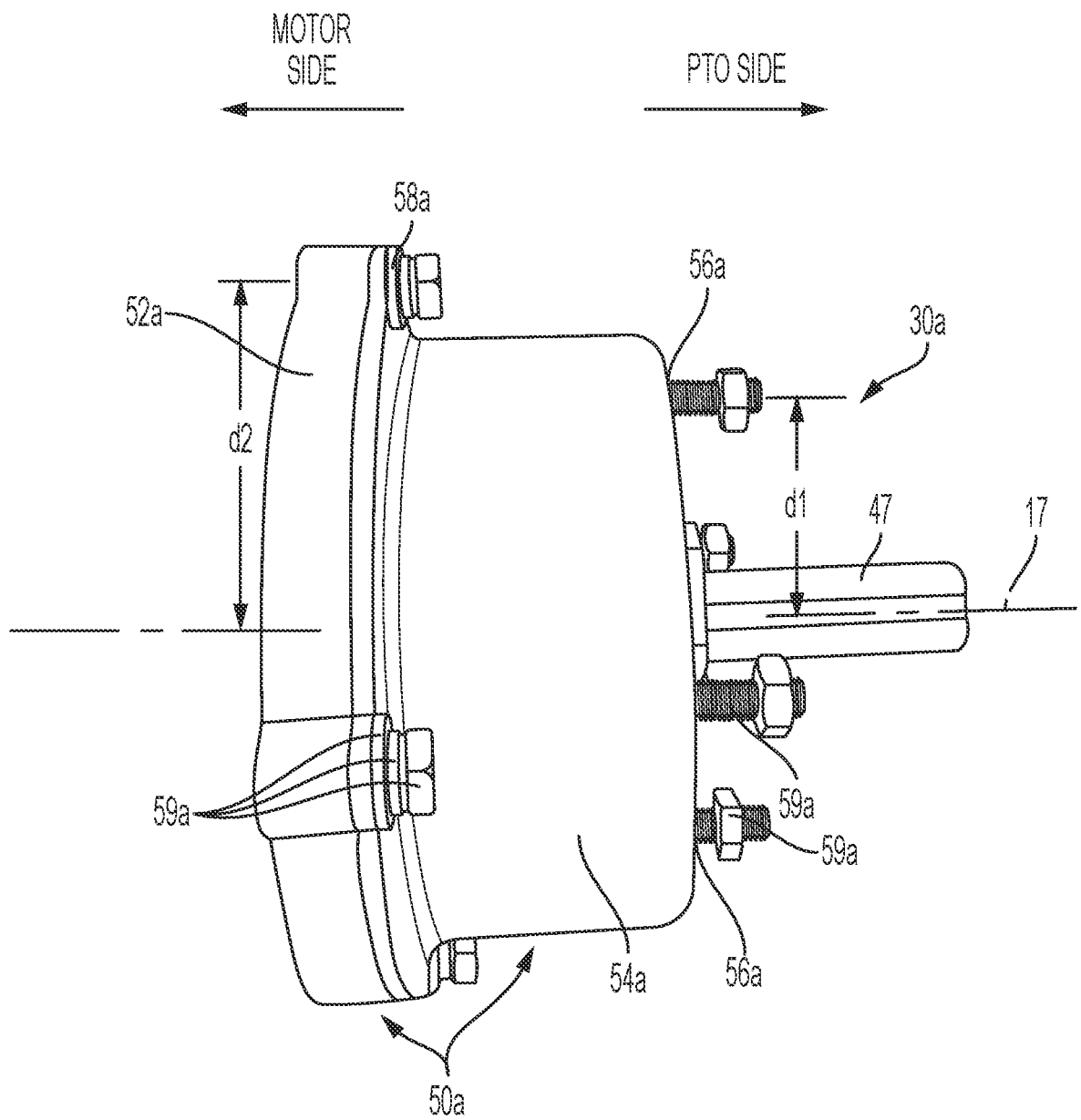
FIG. 4A shows an example of a clutch assembly according to an aspect of the present invention, which includes a clutch housing containing a centrifugal clutch.
Figure 10F:
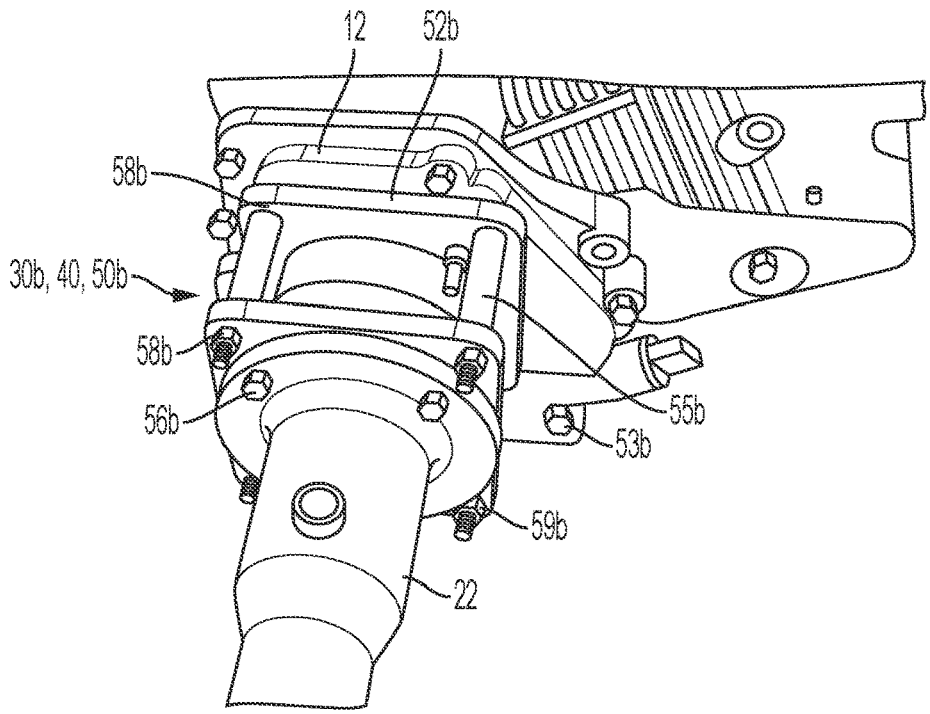

With reference to FIGS. 4A and 10F, clutch assembly 30a, 30b according to aspects of the present invention can be easily installed to new and existing mud motors, such as mud-skipper longtails and twisters. During operation, centrifugal clutch 40 allows driven shaft 24 (FIG. 10D) and propeller 28 (FIG. 8F) of PTO assembly 20 to remain idle while the engine is running at low speed/revolutions. Integrating clutch 40 into the system via clutch housing 50a, 50b can eliminate the need to lift the propeller out of the water to start the engine or to stop the boat. This can allow for easier cold starts without having to hold the propeller out of the water. Different models of clutch assembly 30a, 30b (including centrifugal clutch 40 and clutch housing 50a, 50b) are provided for most brands of mud motors, including those with keyed/slotted connectors or splined connectors and those with 3-7 hp and 8-16 hp engines, for example. Using a clutch can also make docking easier, make it safer to trailer the boat from the water, and can make picking up decoys much faster. The clutch kit can also be run dry without melting the propeller bushing, which is a useful feature for testing and maintenance purposes.

Figure 3A:
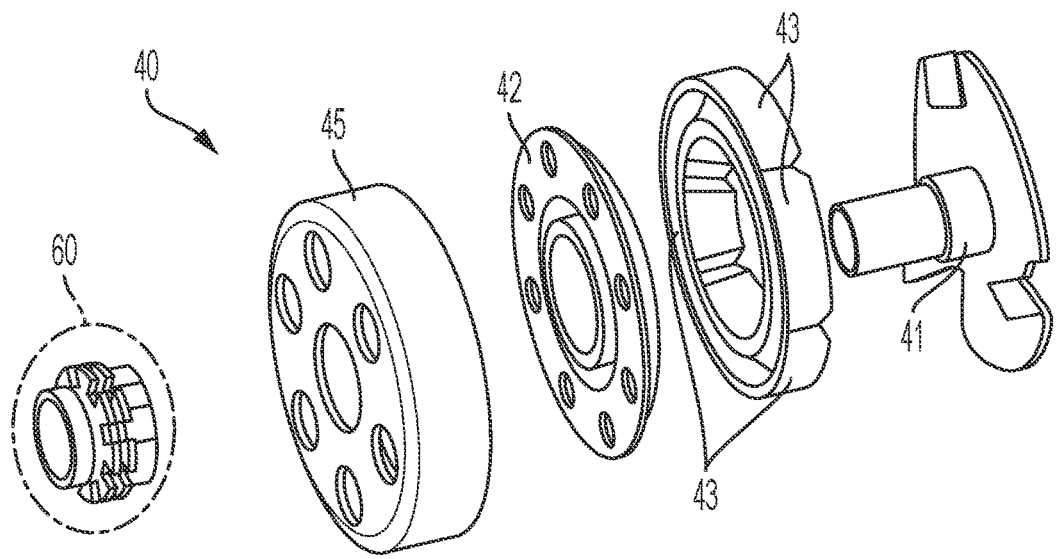
FIG. 3A shows an exploded view of an example clutch assembly.

FIG. 3A shows an exploded view of an example centrifugal clutch 40. Most clutches have a sprocket (e.g., a toothed chin sprocket) to drive a chain. However, for clutch 40 of clutch assembly 30a, 30b according to aspects of the present invention, the sprocket 60 (left side of FIG. 3A) is replaced by a solid shaft 47 (e.g., ⅝" or ¾" or 1" diameter, which may utilize a keyed or slotted or splined connector) as shown in FIG. 3C, for example.

Figure 3B:
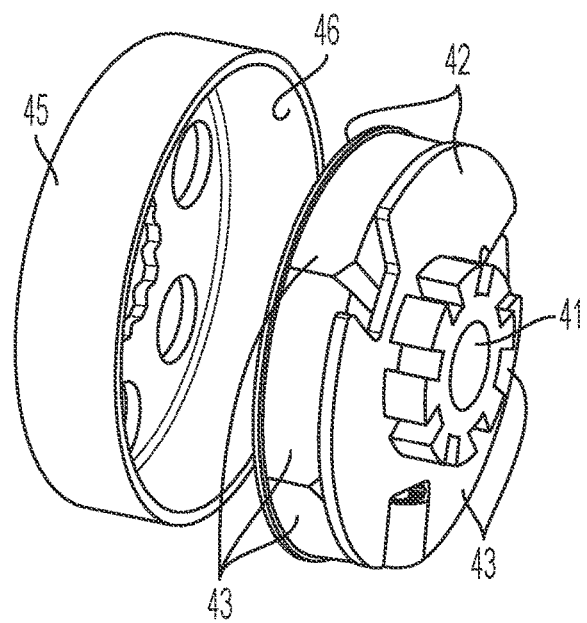
FIG. 3B shows components of the centrifugal clutch of FIG. 3A, including a hub, a shoe, fly-weights, elastic member(s), and an outer drum casing having an inner surface.

FIG. 3B shows components of centrifugal clutch 40, including a hub 41, a shoe 42, fly-weights 43, elastic member(s) 44 (FIGS. 3D-3E)(e.g., one or more springs), and an outer drum casing 45 (FIG. 3C) having a cylindrical inner surface 46. Hub 41 slides over driving shaft 14 (FIG. 1C) of motor 10 and engages with its connectors (keyed, slotted, or splined). When motor 10 runs, driving shaft 14 and hub 41 spin/rotate. As motor speed (revolutions) increases, the centrifugal force acting on fly-weights 43 causes elastic member(s) 44 to expand allowing fly-weights 43 to move outward towards outer drum casing 45. Shoe 42 houses fly-weights 43 and elastic member 44 (FIG. 3D). Fly-weights 43 are adapted to engage with inner surface 46 of outer drum casing 45 when motor output is greater than a threshold speed (higher revolutions), and to disengage with inner surface 46 of outer drum casing 45 when motor output is less than the threshold speed (idle or low revolutions).

Figure 3C:
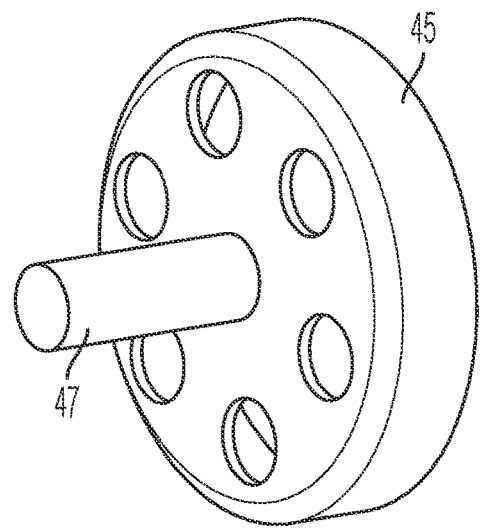
FIG. 3C shows an example of an outer drum casing having a shaft fixed thereto (e.g., welded) according to an aspect of the present invention.
Figure 3D:
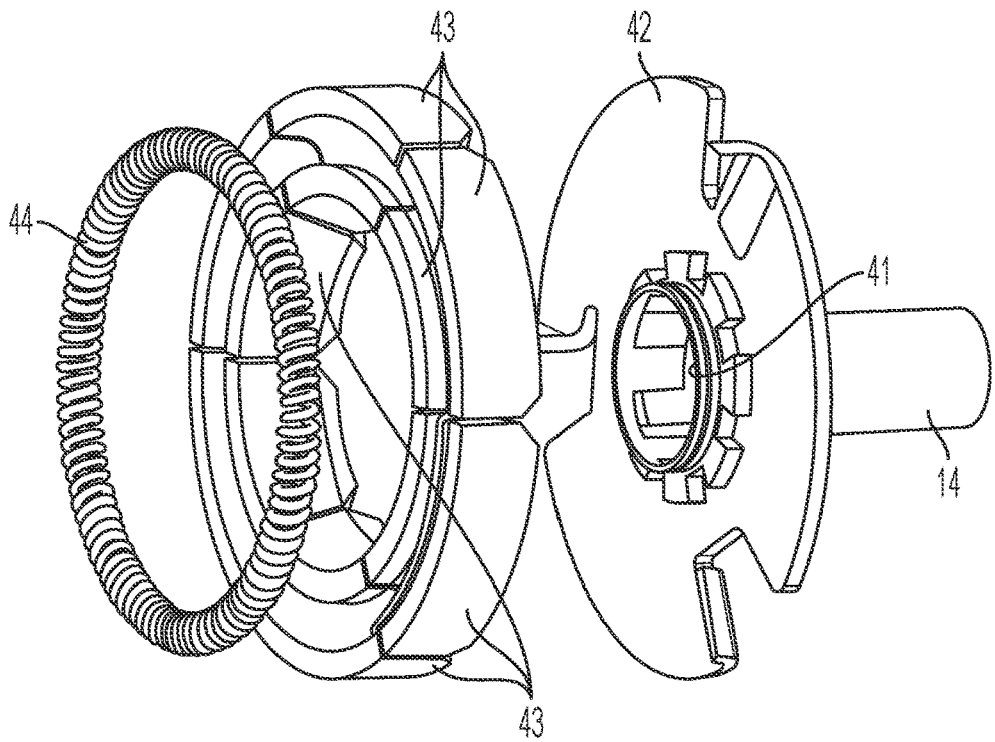
FIGS. 3D and 3E show exploded views of various components of the centrifugal clutch, including the hub, the shoe, the fly-weights, and the elastic member(s)

FIG. 3C shows an example of outer drum casing 45 having a shaft 47 fixed thereto (e.g., welded) according to an aspect of the present invention. A unique adaptation to clutch 40 that differs from existing clutches is to change the output from a sprocket and chain to a solid shaft 47 (e.g., ¾" or 1" diameter, or possibly ⅝"). This could be a keyed shaft 47a, a slotted shaft 47b (FIG. 3F), or an involuted spline shaft 47c (FIG. 3G) in various different example embodiments. As mentioned above, outer drum casing 45 has been modified to have shaft 47 fixedly attached thereto, such as by welding or other suitable fixing technique, where shaft 47 replaces a sprocket that may ordinarily be used with a clutch drum. Shaft 47 is adapted to engage with driven shaft 24 (FIG. 10D) of PTO assembly via a corresponding keyed, slotted, or splined connection. When clutch 40 is engaged at the threshold speed (higher revs), shaft 47 of outer drum casing 45 rotates so as to drive (rotate) driven shaft 24 of PTO assembly 20 and thereby spin/rotate propeller 28 (FIG. 8F). However, shaft 47 does not spin/rotate (i.e., remains idle) when clutch 40 is disengaged at idle speed (low revs), such that driven shaft 24 of PTO assembly 20 does not spin/rotate and hence, propeller 28 remains idle as well.

Figure 3E:
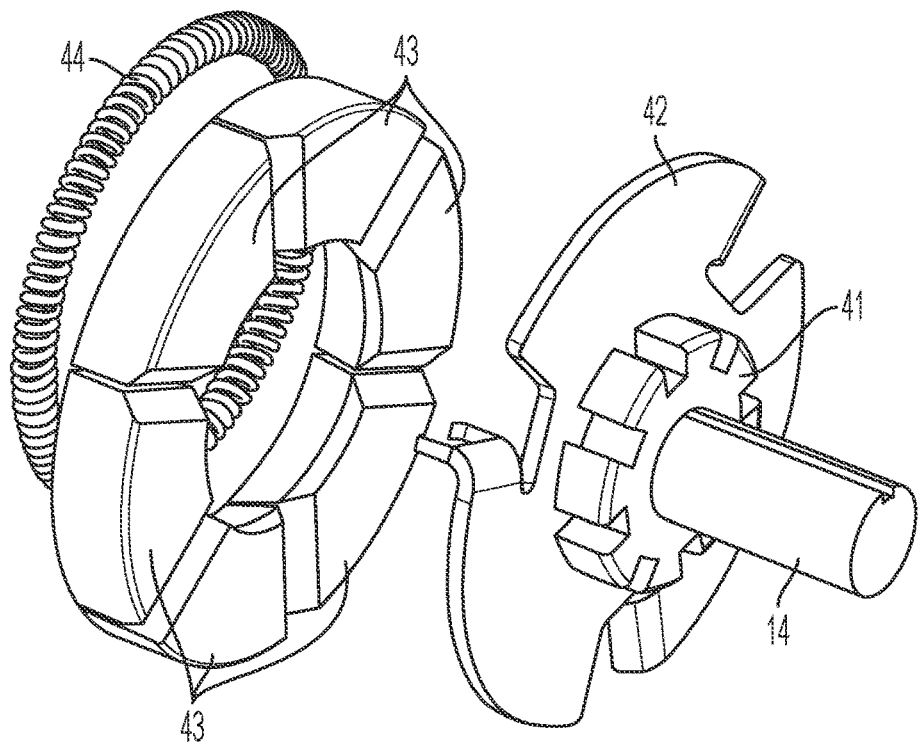

FIGS. 3D and 3E show exploded views of various components of centrifugal clutch 40, including hub 41, shoe 42, fly-weights 43, and elastic member(s) 44. Hub 41 of clutch 40 is adapted to receive and engage with driving shaft 14 of motor 10. A keyed connector 19 (FIG. 1B) on driving shaft 14 may be used with mud motor assembly 10, as shown in FIG. 3E, for example.

Figure 3F:
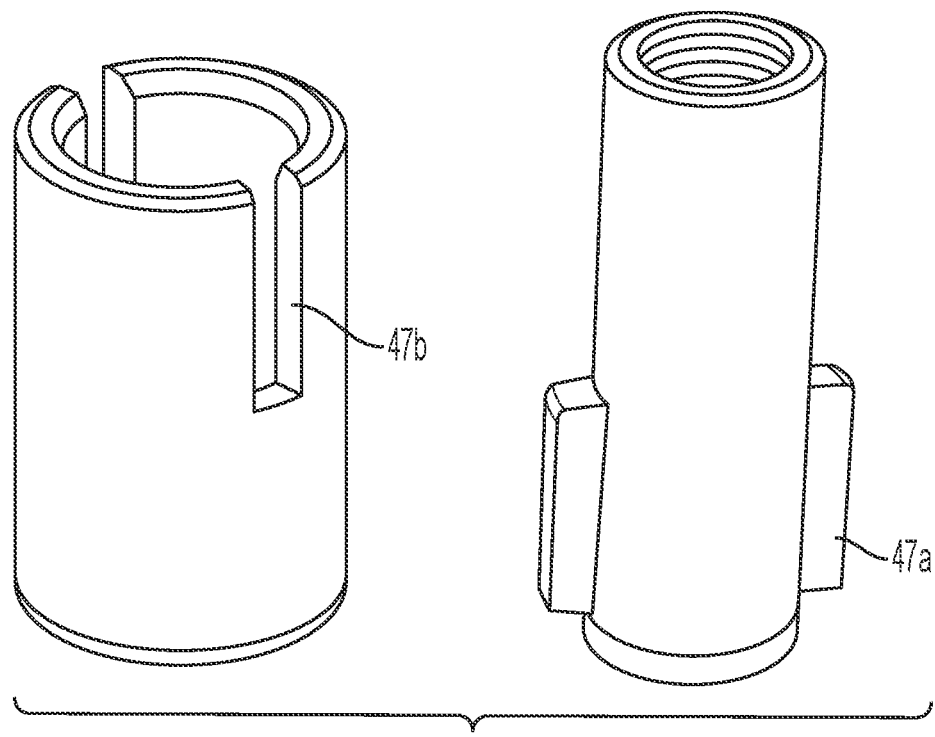
FIG. 3F shows an example of a shaft with slotted connectors (female and male)
Figure 3G:
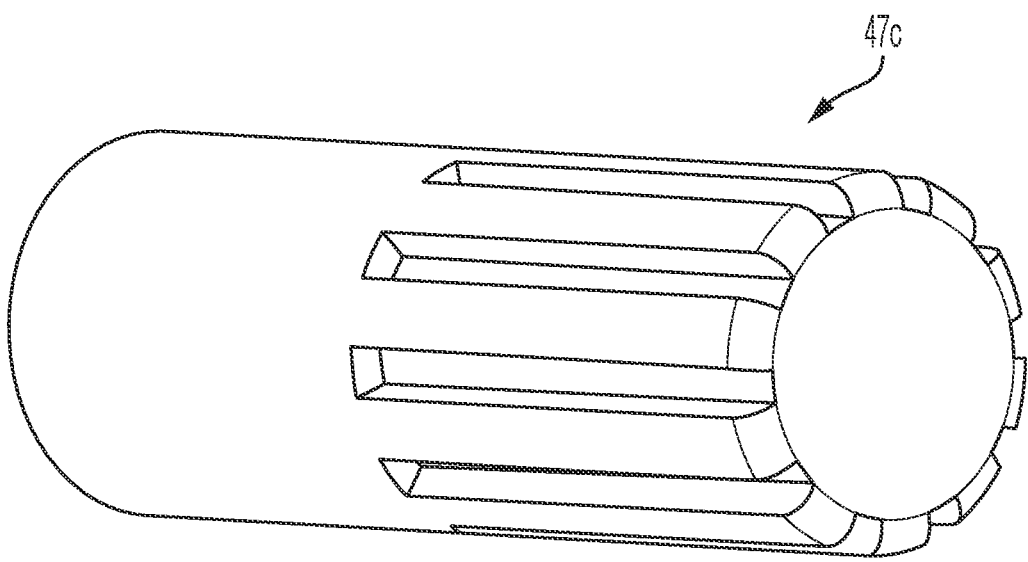
FIG. 3G shows an example of a shaft with a splined connector.

FIG. 3F shows an example of a shaft with slotted connectors 47a, 47b (male and female, respectfully). Slotted connectors 47a, 47b may be used on older style Thai mud motors, for example. FIG. 3G shows an example of a shaft with a splined connector 47c. A splined connector 47c may be used on newer Thai mud motors, for example.

Figure 4B:
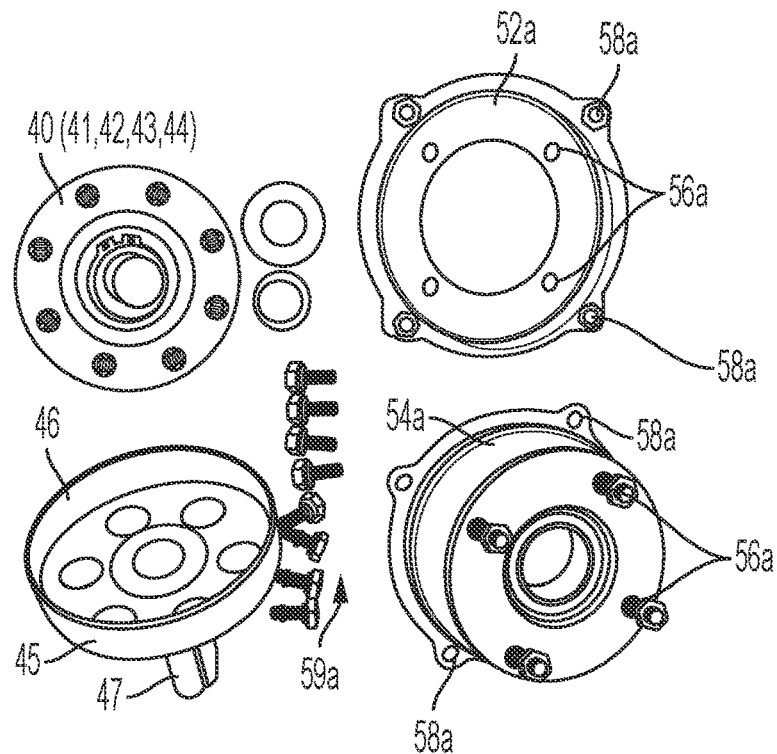
FIGS. 4B and 4C show components of the centrifugal clutch and the clutch housing of the clutch assembly of FIG. 4A.
Figure 4C:
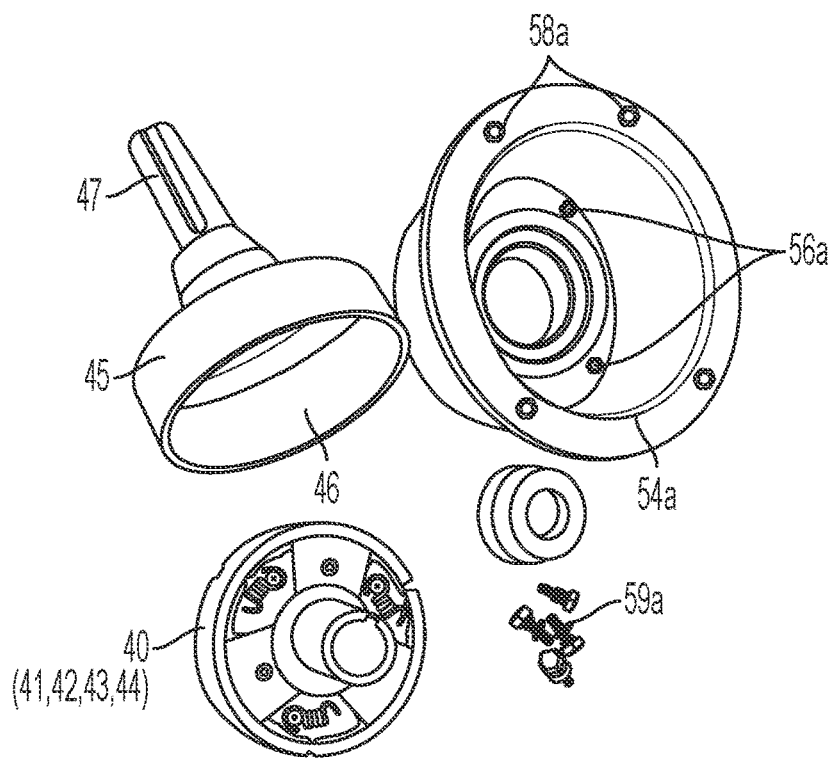

FIG. 4A shows an example of a clutch assembly 30a according to aspects of the present invention, which includes a clutch housing 50a containing a centrifugal clutch 40 shown in FIG. 3A. Clutch housing 50a includes a base plate 52a (FIGS. 7A-7B) having an inner mounting pattern/features 56a and an outer mounting pattern/features 58a. Inner mounting pattern/features 56a are radially disposed at first distance d1 from longitudinal axis 17 of driving shaft 14 of motor 10, and outer mounting pattern/features 58a are radially disposed at a second distance (d2) from longitudinal axis 17 of driving shaft 14 of motor 10, where second distance d2 is greater than first distance d1. The second distance d2 is also large enough to accommodate the diameter (or radial distance) of clutch 40 and its outer drum casing 45. Fasteners 59a are used to attach base plate 52a to motor body 12 via inner mounting pattern/features 56a of base plate 52a, to attach cup 54a to base plate 52a via their respective outer mounting pattern/features 58a, and to attach cup 54a to PTO housing 22 (FIG. 2B) via inner mounting pattern/features 56a of cup 54a. Shaft 47 of outer casing 45 of clutch 40 protrudes out from cup 54a on the PTO side. FIGS. 4B and 4C show exploded views of the components of centrifugal clutch 40 and clutch housing 50a of clutch assembly 30a.

Figure 5A:
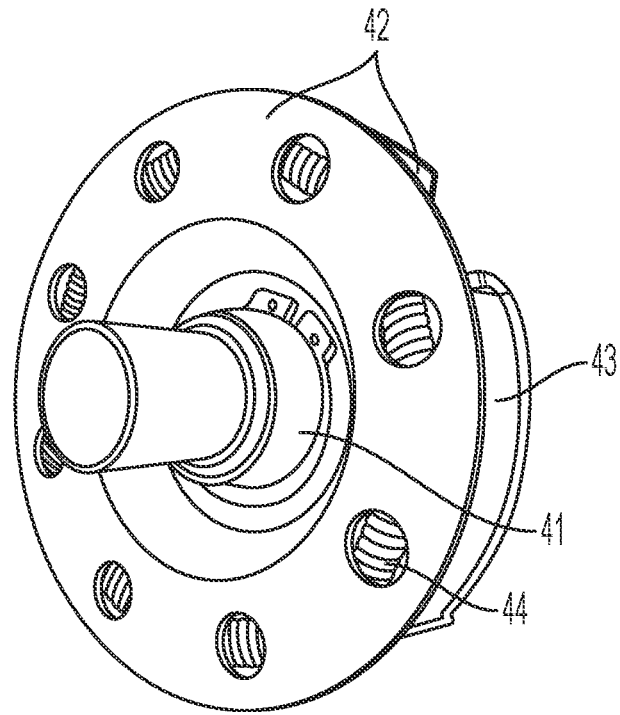
FIGS. 5A-5D show various views of components of the centrifugal clutch of FIG. 3A.
Figure 5B:
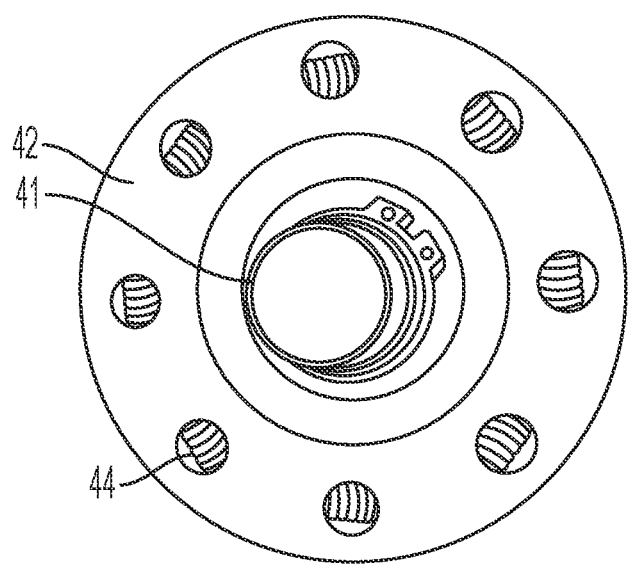
Figure 5C:
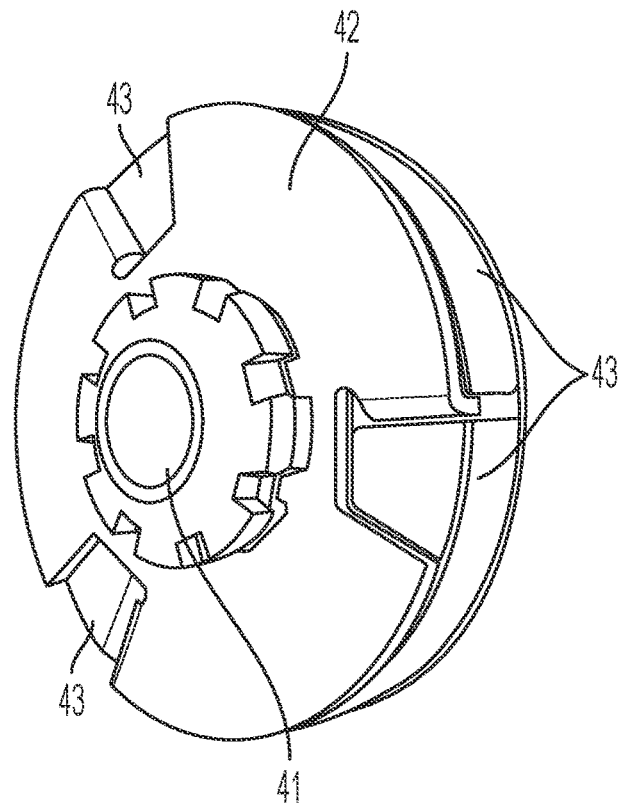
Figure 5D:
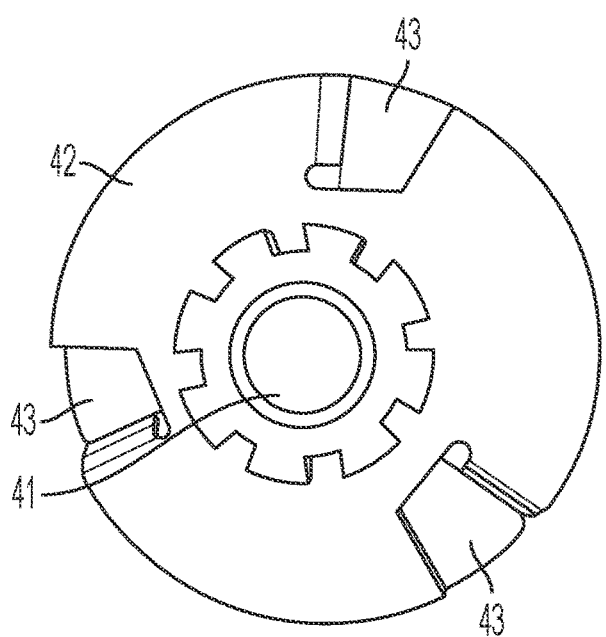

FIGS. 5A-5D show various views of centrifugal clutch 40. FIGS. 5A and 5B show a front perspective view of clutch 40 facing the PTO side (FIG. 4A), and FIGS. 5C and 5D show a back perspective view of clutch 40 facing the motor side (FIG. 4A).

FIGS. 6A-6C show various views of outer drum casing 45 of clutch 40. Outer drum casing 45 has an inner surface 46 (FIG. 6A) and a shaft 47 fixed thereto. Inner surface 46 is adapted to engage with fly-weights 43 (FIGS. 5A, 5B) of clutch 40, and shaft 47 is adapted to engage with driven shaft 24 (FIG. 10D) of PTO assembly 20.

Figure 7A:
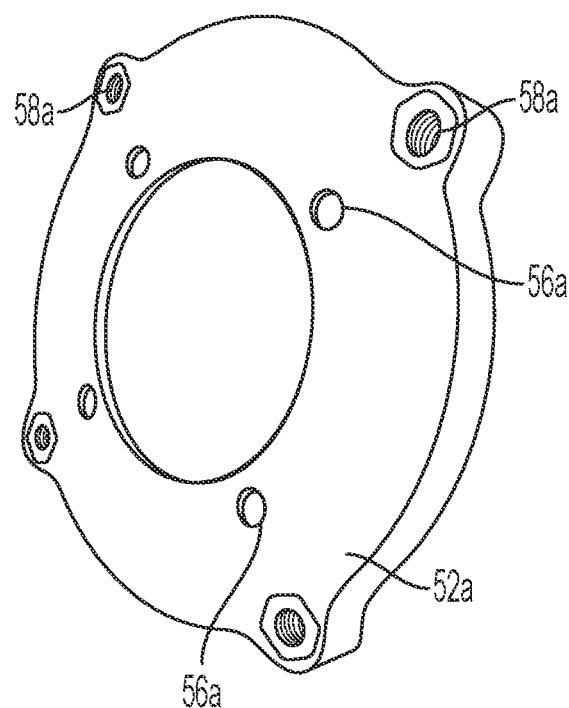
FIGS. 7A and 7B show back and front perspective views of the base plate of the clutch housing.
Figure 7B:
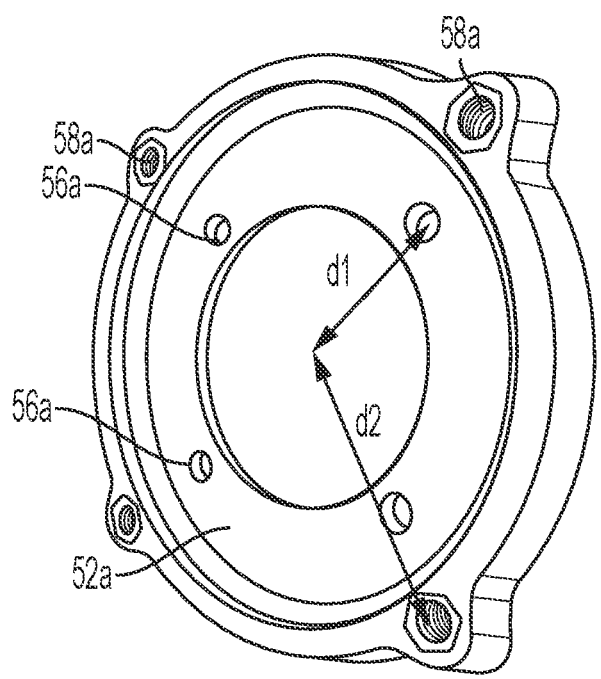
Figure 7C:
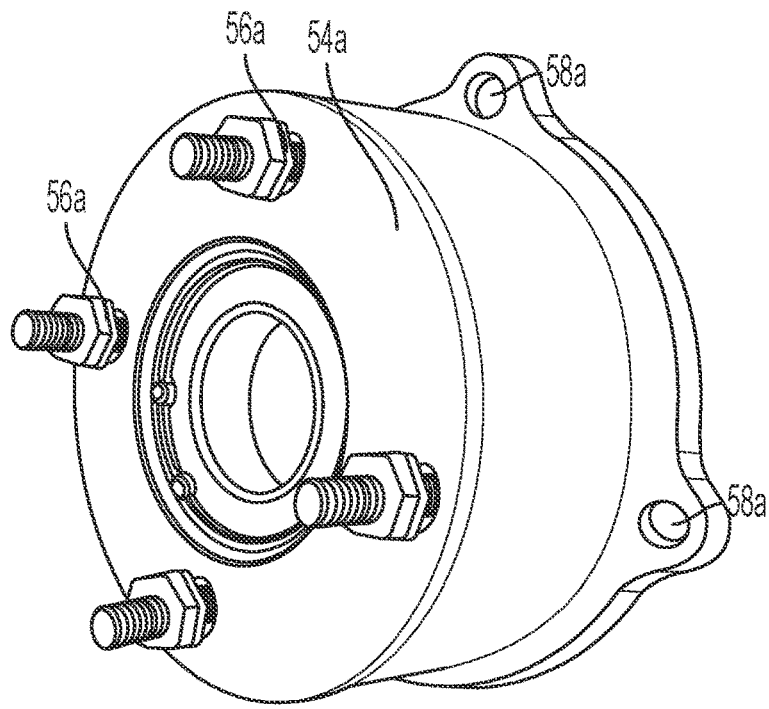
FIGS. 7C and 7D show front perspective views of the cup of the clutch housing of FIGS. 4A-4C.
Figure 7D:
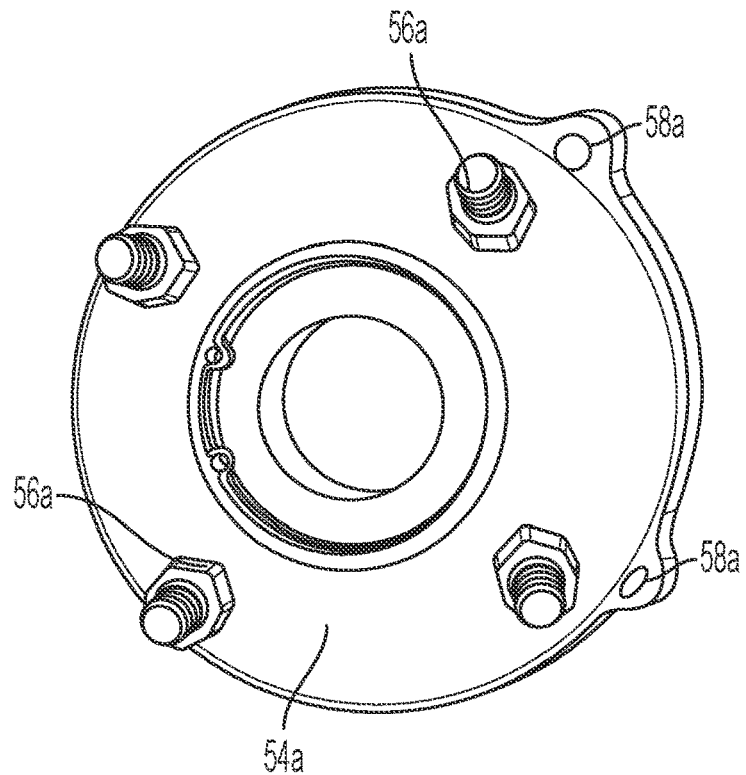
Figure 7E:
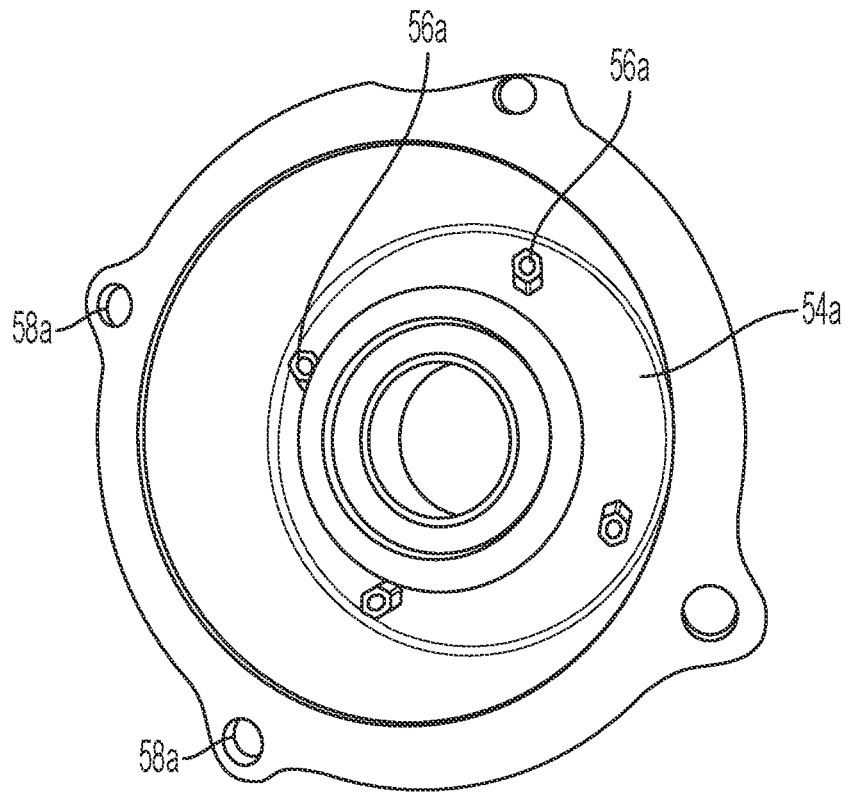
FIGS. 7E and 7F show back perspective views of the cup of the clutch housing of FIGS. 4A-4C.
Figure 7F:
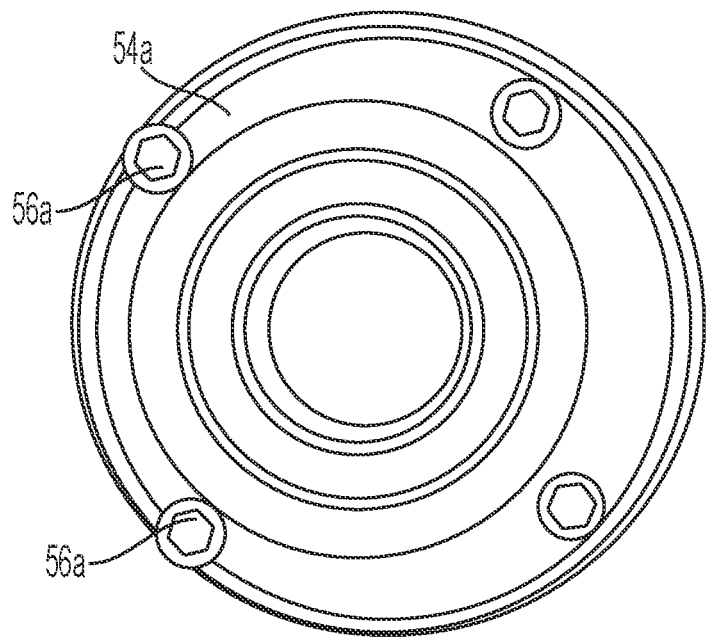

FIGS. 7A and 7B show back and front perspective views of base plate 52a of clutch housing 50a. In some example embodiments, base plate 52a may have a round or circular shape. However, base plate 52a may have another suitable shape (e.g., square) in other example embodiments. Base plate 52a includes inner mounting pattern/features 56a that aligns with mounting pattern/features 16 (FIG. 1A) of motor 10, and outer mounting pattern/features 58a that align with outer mounting pattern/features 58a of cup 54a (FIGS. 4A-4C) of clutch housing 50a. FIGS. 7C and 7D show front perspective views of cup 54a of clutch housing 50a (FIG. 4A, PTO side). FIGS. 7E and 7F show back perspective views of cup 54a of clutch housing 50a (FIG. 4A, motor side). Cup 54a includes inner mounting pattern/feature 56a (end on PTO side) that aligns with mounting pattern/features 26 (FIG. 2B) of PTO housing 22, and outer mounting pattern/features 58a (end on motor side) that aligns with outer mounting pattern/features 58a of base plate 52a. Inner mounting pattern/features 56a of base plate 52a and cup 54a (FIGS. 4A-4C) are radially disposed at first distance d1 from longitudinal axis 17 of driving shaft 14 (FIGS. 1B-1C) of motor 10 (as well as shaft 47 of outer drum casing 45 of clutch 40, and driven shaft 24 (FIG. 10D) of PTO assembly 20). Outer mounting pattern/features 58a of base plate 52a and cup 54a are radially disposed at second distance d2 from longitudinal axis 17 of driving shaft 14 of motor 10 (and similarly, shaft 47 and driven shaft 24), where the second radial distance d2 is greater than the first radial distance d1. According to another aspect, the radius of outer drum casing 45 (FIG. 3C) of clutch 40 is greater than first distance d1, but less than the second distance (d2). The second radial distance d2 of outer mounting pattern/features 58a is designed to accommodate the larger radius of outer drum casing 45 of clutch 40 relative to the smaller radial distance d1 of mounting pattern/features 16 (FIG. 1A), 26 (FIG. 2B) of motor body 12 and PTO housing 22 (FIG. 2B), respectively. Fasteners 59a (FIGS. 4A-4C) may be used to attach the various components together. Various known fasteners may be used, including but not limited to bolts, nuts, washers, and other similar types of attachment hardware. Although bolts, washers, and nuts are shown in the examples in the drawings, example embodiments are not limited thereto.

Figure 8A:
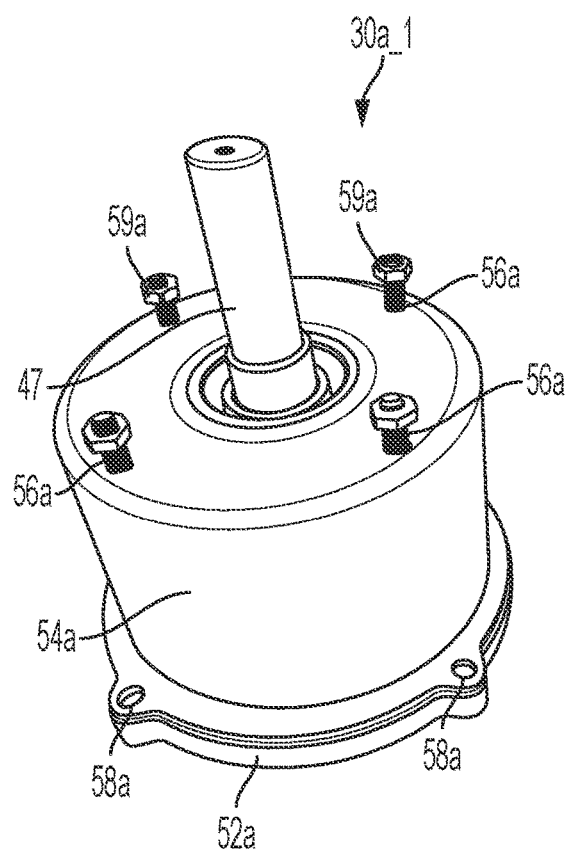
FIGS. 8A and 8B show two examples of a clutch assembly according to aspects of the present invention, which includes an example of a clutch housing containing a centrifugal clutch, with each clutch housing having different dimensions and different sized mounting patterns/features.
Figure 8B:
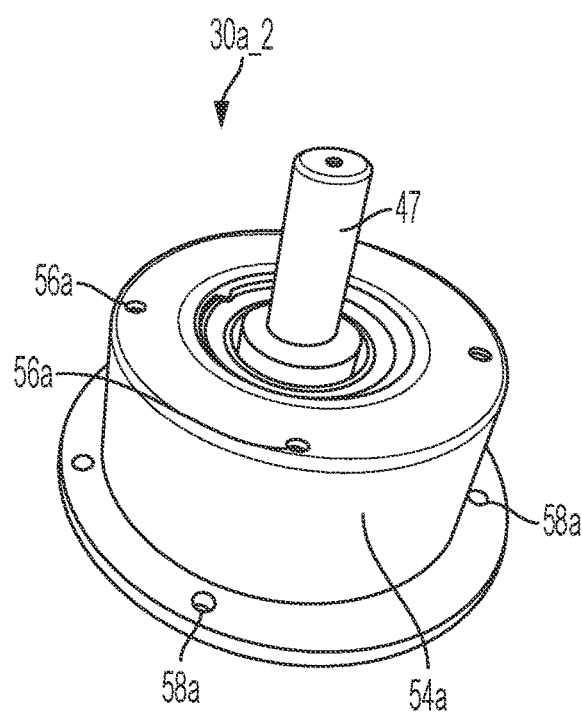

FIGS. 8A and 8B show two examples 30a_1 and 30a_2 of a clutch assembly 30a according to aspects of the present invention, which includes an example of a clutch housing 50a (FIG. 4A) containing a centrifugal clutch 40 (FIG. 3A), with each clutch housing 50a having different dimensions (e.g., length, width, depth) and different sized mounting patterns/features 56a, 58a. In FIG. 8A, base plate 52a of clutch housing 50a has inner mounting pattern/features 56a (not shown) having a smaller radial distance d1 (FIG. 7B) that enables base plate 52a to be mounted onto body 12 (FIGS. 1A-1B) of motor 10, and outer mounting pattern/features 58a having a larger radial distance d2 that enables cup 54a of clutch housing 50a to be mounted onto base plate 52a of clutch housing 50a. The two examples of clutch housings 50a shown in FIGS. 8A and 8B may accommodate different sizes of clutches 40 and/or different sizes of driving shafts 14 of motor 10 (and similarly, shafts 47 of outer drum casing 45 of clutch 40 and/or driven shafts 24 of PTO assembly 20).

Figure 8C:
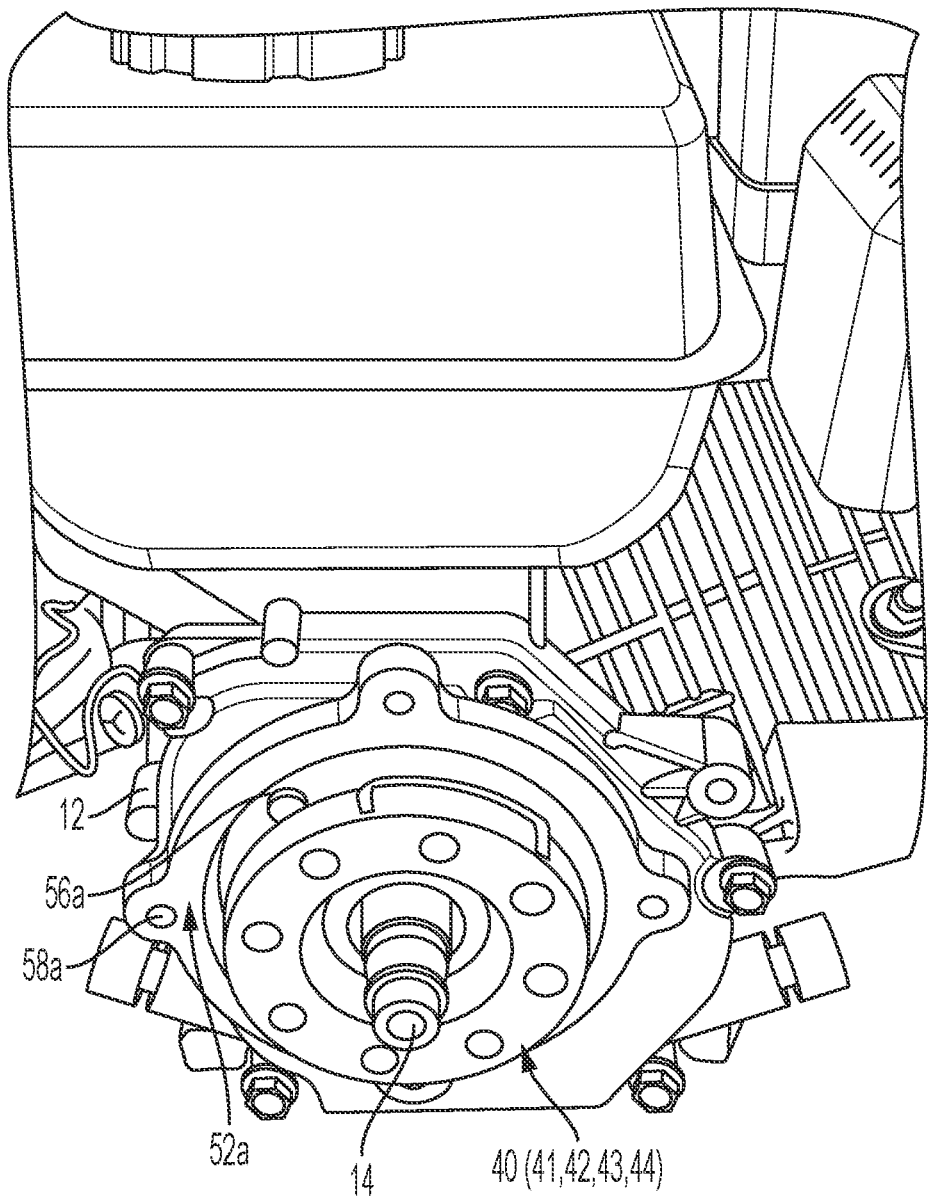
FIG. 8C shows the base plate of the clutch housing attached to the body of the motor, with the centrifugal clutch attached to the driving shaft of the motor.
Figure 8D:
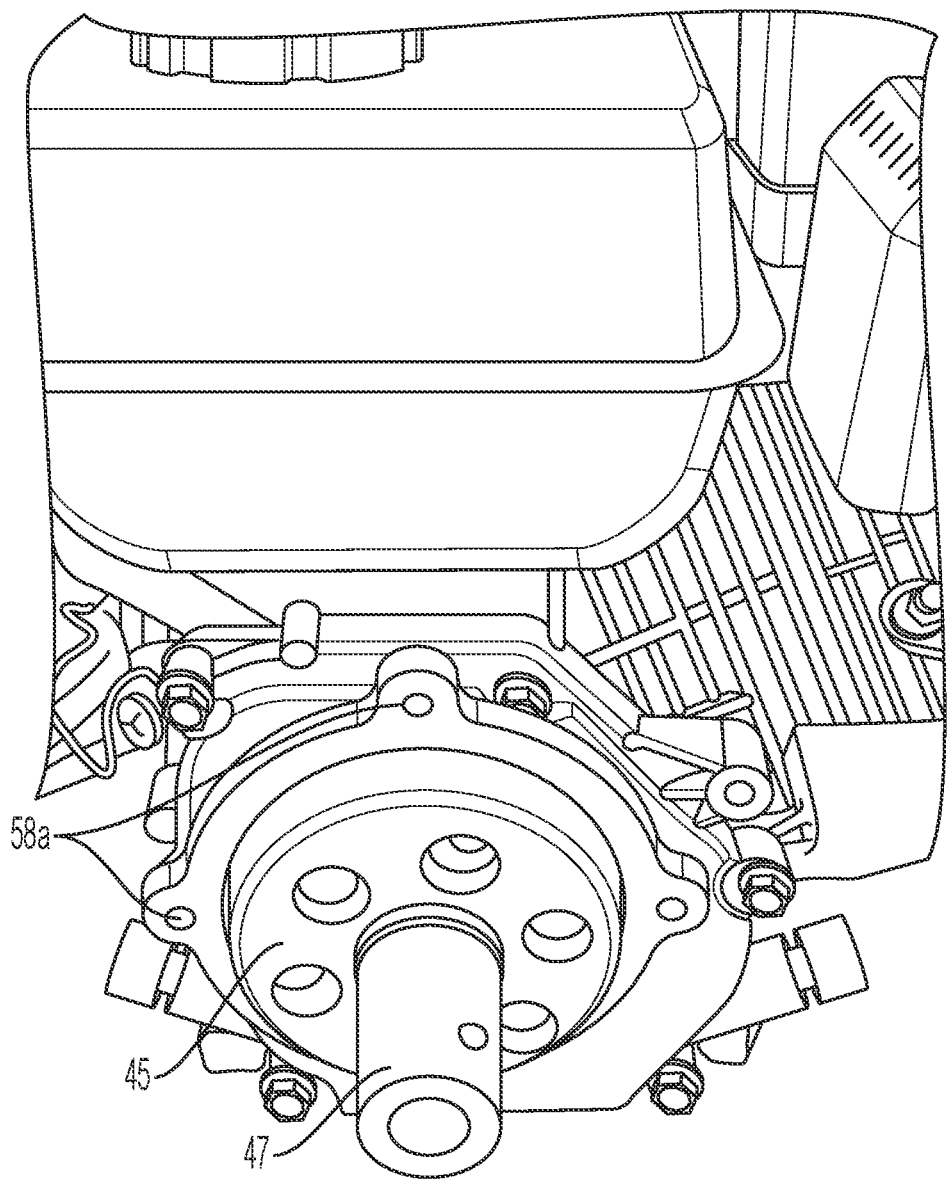
FIG. 8D shows the outer drum casing of the centrifugal clutch installed over the various components of the clutch (hub, shoe, fly-weights, elastic member)

FIG. 8C shows base plate 52a of clutch housing 50a (FIG. 4A) attached to body 12 (FIGS. 1A-1B) of motor 10, with centrifugal clutch 40 attached to driving shaft 14 of motor 10. FIG. 8D shows outer drum casing 45 of centrifugal clutch 40 (FIG. 8C) installed over the various components of clutch 40 (hub 41, shoe 42, fly-weights 43, elastic member 44).

Figure 8E:
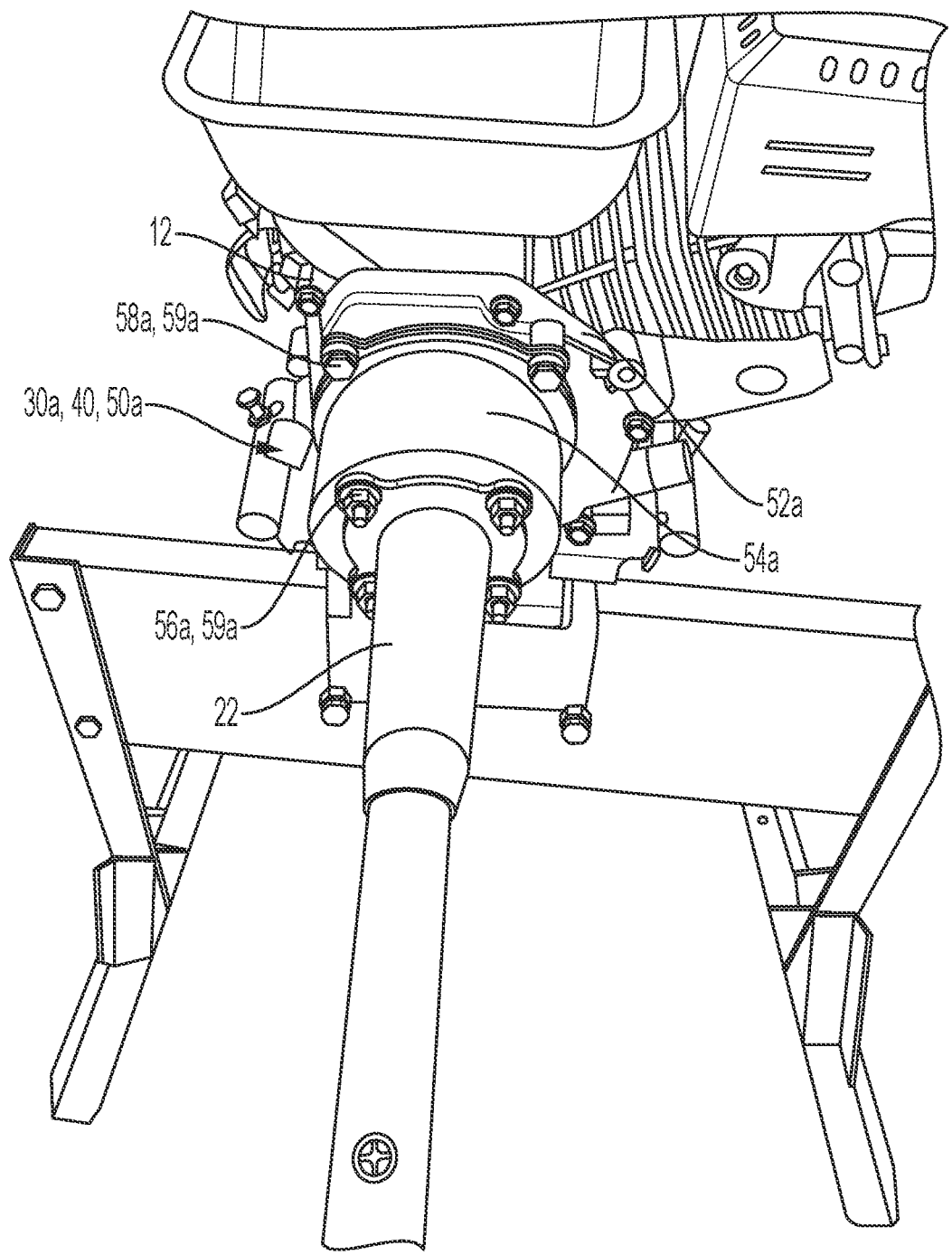
FIG. 8E shows an installed clutch assembly with an example clutch housing connected to the motor body, and with an example PTO housing connected to the clutch housing.
Figure 8F:
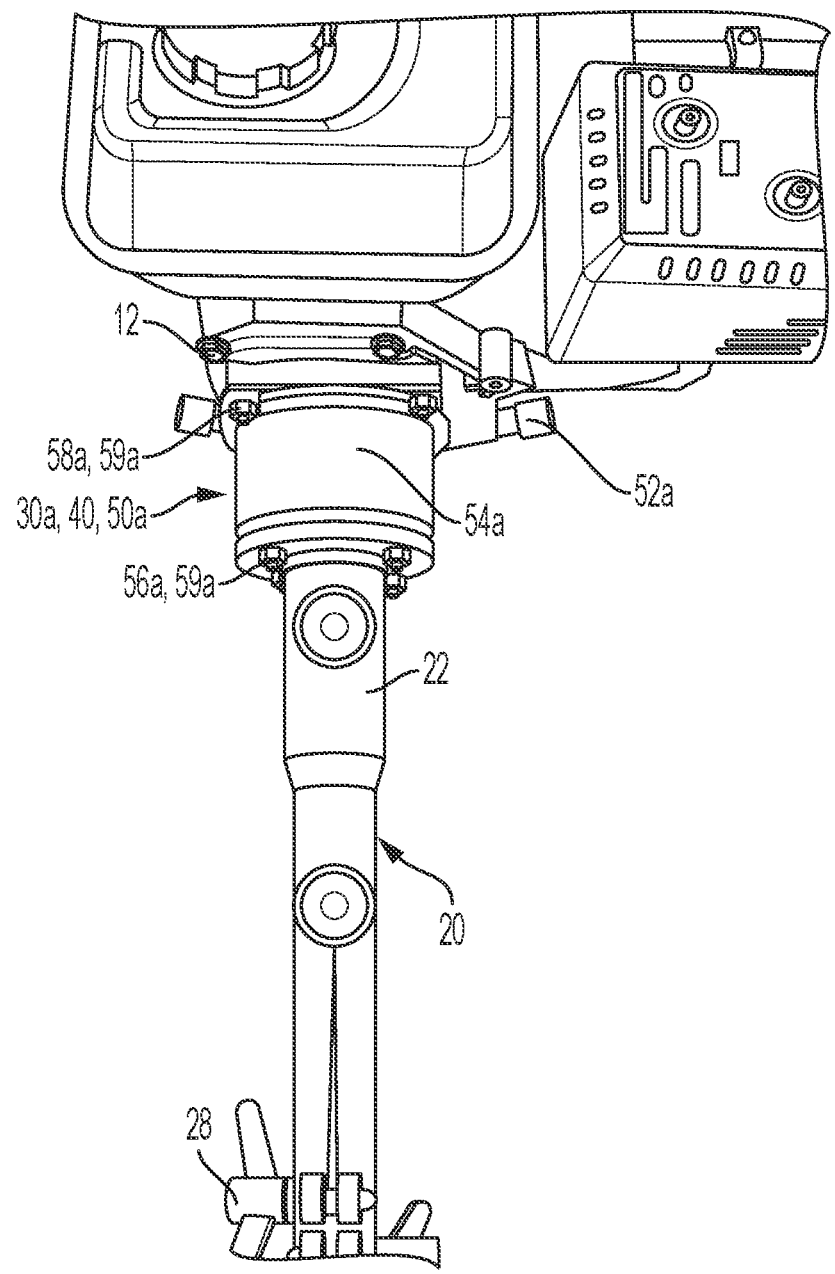
FIG. 8F shows an installed clutch assembly with another example clutch housing connected to the motor body, and with another example PTO housing connected to the clutch housing.

FIG. 8E shows an installed clutch assembly 30a, 40, 50a with clutch housing 50a connected to motor body 12, and with an example PTO housing 22 connected to clutch housing 50a. This example shows a Chinese longtail PTO unit bolted to clutch housing 50a.

FIG. 8F shows an installed clutch assembly 30a, 40, 50a, with clutch housing 50a connected to motor body 12, and with another example PTO housing 22 connected to clutch housing 50a. A propeller 28 is also shown attached at one end of PTO housing 22 (and driven shaft 24 contained therein). This example shows a Thai PTO unit bolted to clutch housing 50a, and utilizing slotted connectors or splined connectors (e.g., ten points).

Although example embodiments described above with reference to FIGS. 4A-4C, 7A-7F, and 8A-8F utilize a "cup and base plate" idea for clutch housing 50a, the present invention is not limited thereto. Various modifications to the design of the clutch housing may be made, such as described below with reference to FIGS. 9A-9B, 10A-10G, and 11A-11B.

Figure 9A:
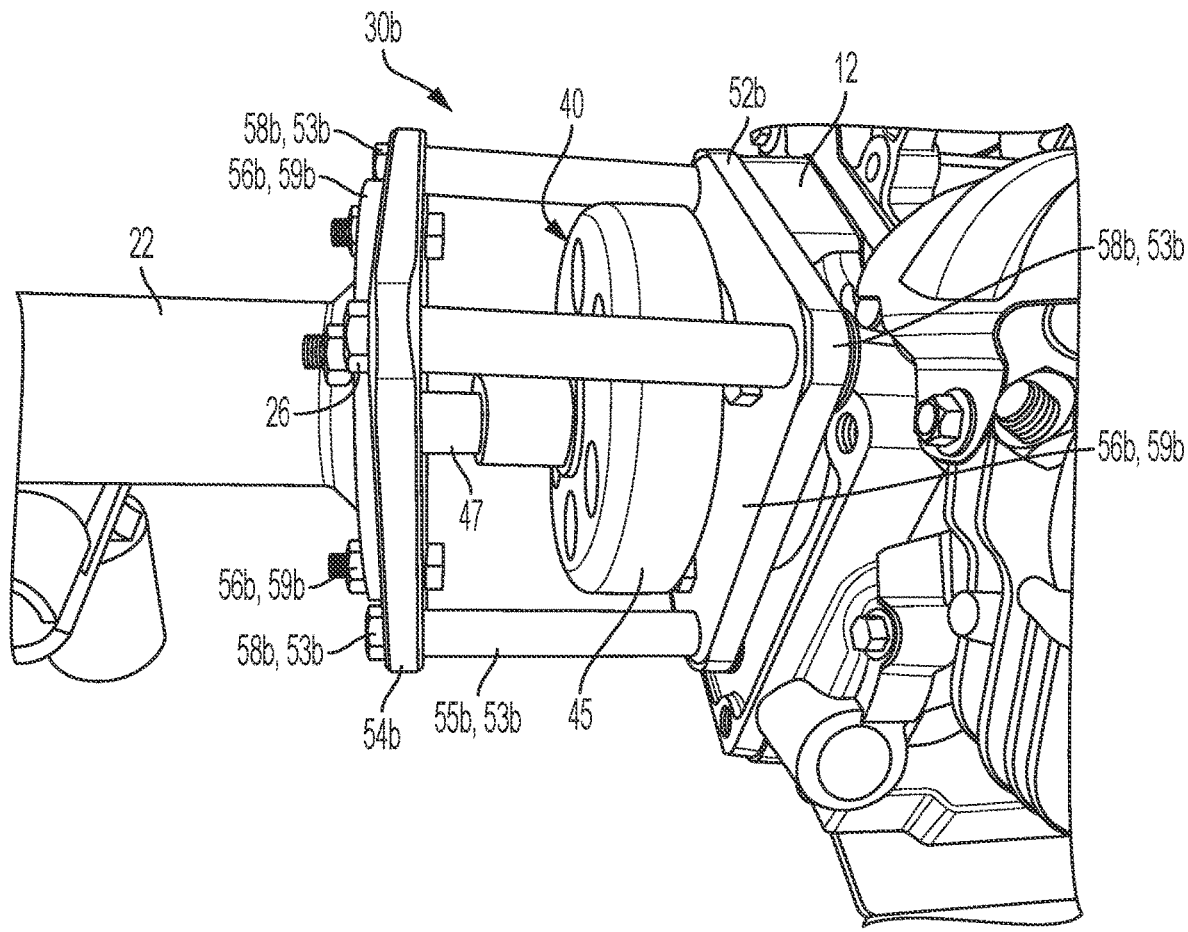
FIG. 9A shows another example of a clutch assembly according to aspects of the present invention, which includes another example of a clutch housing containing a centrifugal clutch.

FIG. 9A shows another exemplary of a clutch assembly 30b according to aspects of the present invention, which includes another example of a clutch housing 50b (FIGS. 10F-10G) containing a centrifugal clutch 40. In this variation, clutch housing 50b includes two simple metal plates, whereby a first plate 52b is fastened (e.g., bolted) to motor body 12 (right side of FIG. 9A) and a second plate 54b is fastened (e.g., bolted) to PTO housing 22 (left side of FIG. 9A). In some example embodiments, first and second plates 52b, 54b may have a square shape. However, plates 52b, 54b may have another suitable shape (e.g., round or circular) in other example embodiments. Also, both plates 52b and 54b may have the same shape as each other (e.g., both square or round/circular) or different shapes (one square and the other round/circular). Both first plate 52b and second plate 54b have inner mounting pattern/features 56b (having the first radial distance d1 that align with mounting pattern/features 16 of motor 10 and mounting pattern/features 26 of PTO assembly 20, and outer mounting pattern features 58b having second radial distance d2, which is greater than the first radial distance d1 that align with each other. The first and second plates 52b, 54b are held together by elongated spacer bolts 53b (e.g., 3.5" M8 bolts), and kept apart from each other by spacer tubes 55b (e.g., hollow aluminum pipes), which slide over spacer bolts 53b in between first and second plates 52b, 54b. It should be appreciated that lengths of spacer bolts 53b and/or spacer tubes 55b may vary, and hence distances between plates 52b, 54b of clutch housing 50b may similarly vary. Therefore, it is noted that example embodiments of such lengths and/or distances as shown in the drawings may not be to-scale and are not intended to be limiting. Fasteners 59b may be used to attach the various components together.

Figure 9B:
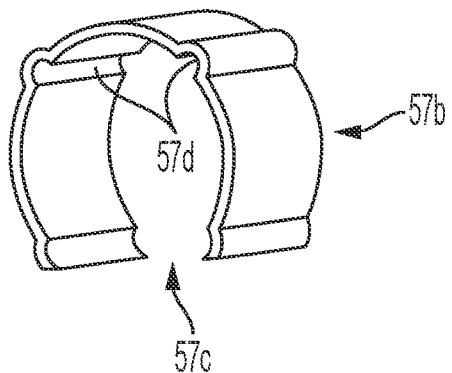
FIG. 9B shows a cover that is configured to be disposed over the entire clutch assembly.
Figure 10G:
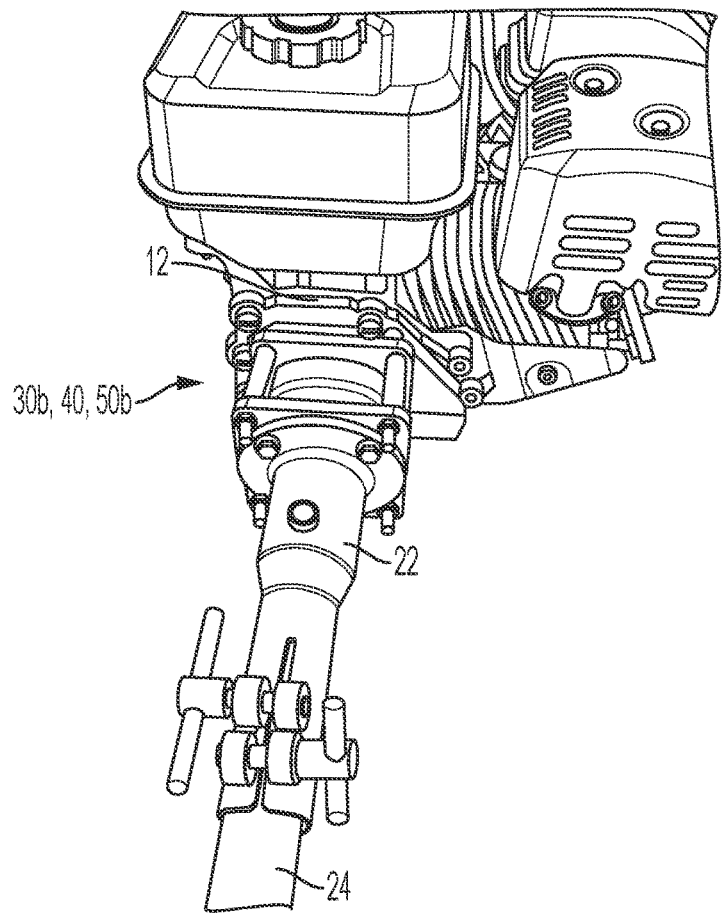

FIG. 9B shows a cover 57b that is designed to be disposed over the entire clutch assembly 30b, 40, 50b (FIGS. 10F-10G). With additional reference to FIG. 9, cover 57b may have an opening 57c on one side (to enable snap-on installation) and detents 57d in an arrangement that corresponds to outer mounting pattern/features 58b of first and second plates 52b, 54b (as well as spacer bolts 53b and spacer tubes 55b). Detents 57d are designed to engage with spacer tubes 55b around spacer bolts 53b, to help secure cover 57b in place once installed. Cover 57b may be made out of plastic in some example embodiments (e.g., using 3D printing, molds, or other shaping techniques), which allows cover 57b to easily snap into position over clutch 40 as well spacer bolts 53b and spacer tubes 55b, and in between first plate 52b and second plate 54b. It should be appreciated that the dimensions (length or width or depth) of cover 57b may vary, depending on the dimensions of clutch 40 and/or outer drum casing 45, for example. Installing cover 57b for safety can help keep fingers or other body parts out of harm's way from clutch 40 while spinning/rotating during operation of motor 10.

FIGS. 10A-10G illustrate various steps for installing clutch assembly 30b, including centrifugal clutch 40 and clutch housing 50b, between motor body 12 and PTO housing 22. In some example embodiments, spacer bolts 53b with spacer tubes 55b on them are simply pushed through first plate 52b at outer mounting pattern/features 58b and trapped in between first plate 52b and motor body 12. In some example embodiments, another spacer (e.g., about ½") may be placed over driving shaft 14 of motor 10, after first plate 52b is installed on motor body 12, in order to offset the clutch 40 or any of its components 41, 42, 43, 44 from hitting the fasteners 59b holding first plate 52b to motor body 12 (refer to FIGS. 10A-10C).

Figure 11A:
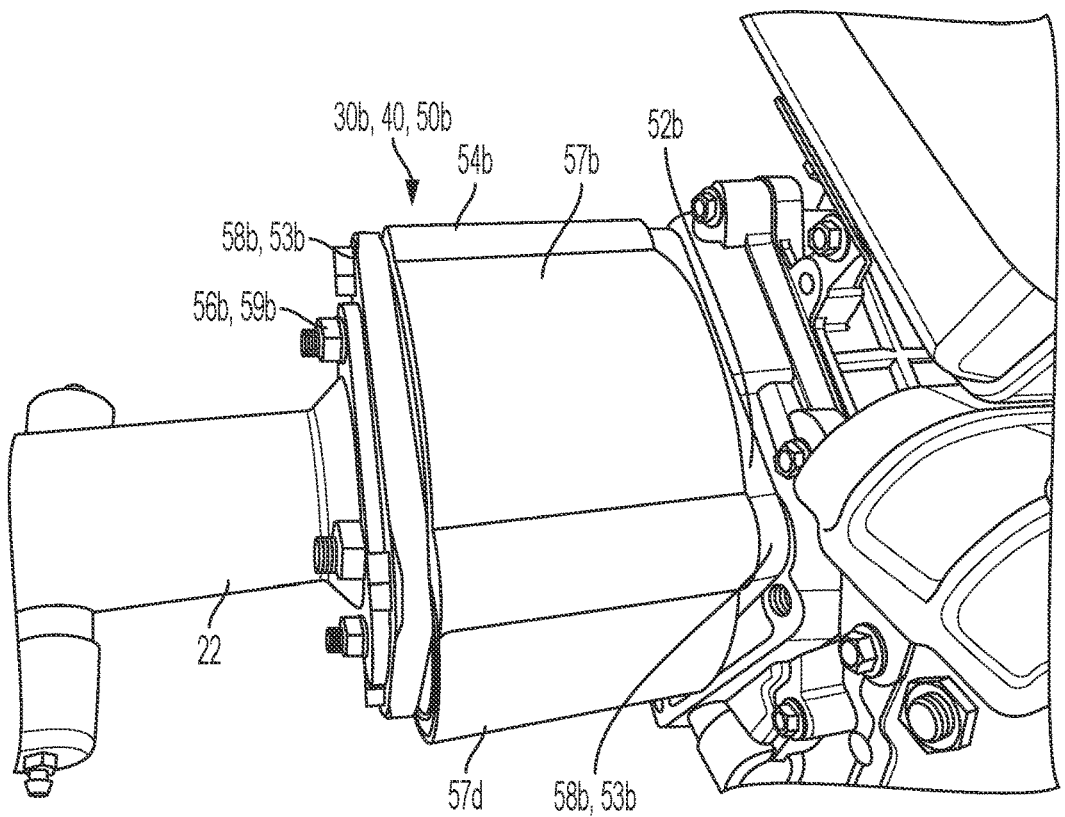
FIGS. 11A and 11B show the cover of FIG. 9B installed on the clutch assembly between the first and second plates and over the spacer bolts and spacer tubes.
Figure 11B:
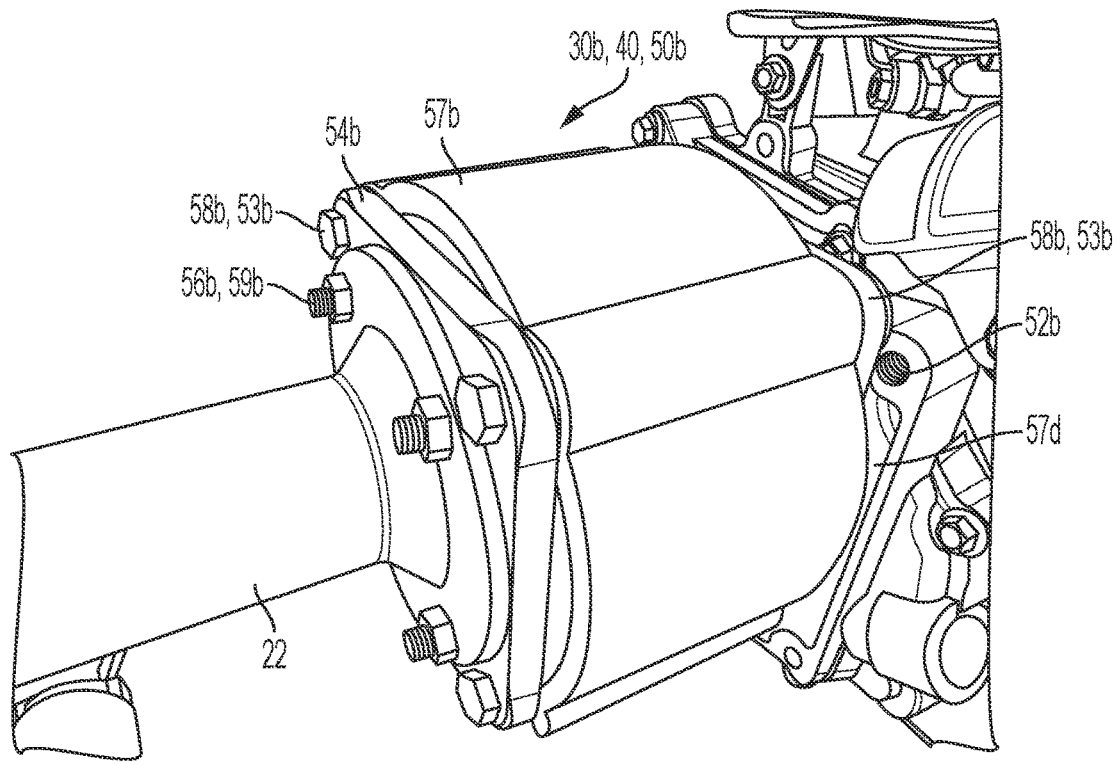

FIGS. 11A and 11B show cover 57b installed on clutch assembly 30b, 40, 50b between first and second plates 52b, 54b and over spacer bolts and spacer tubes 53b, 55b. In order to install cover 57b on clutch housing 50b, it may be useful to loosen/slacken spacer bolts 53b slightly to allow cover 57b to go over spacer tubes 55b more easily. Once installed, tightening spacer bolts 53b back up may cause cover 57b to be clamped in between first plate 52b and second plate 54b, thereby securing it on spacer tubes 55b and/or within clutch housing 50b.

Thus, according to example embodiments described above with reference to the drawings, the present invention provides a system for integrating clutches to fit multiple different sizes of mud motor shafts (e.g., ⅝", ¾", and 1"). The clutch drum has a shaft affixed to it to fit the various mud motor PTO propeller shafts. The clutch housing needs to be bigger than the clutch drum, because the drum covers the motor bolt holes. Two different example designs for the clutch housing and its components are provided, although other modifications are possible. The clutch housing provides a "step up-step down" feature that is needed to get around the smaller bolt holes available on the motor and the PTO housing to functionally integrate the clutch in the clutch housing between the motor and the PTO propeller shaft. Integrating the clutch between the motor assembly and the PTO assembly in the manner set forth herein provides numerous technical advantages as described above.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A clutch assembly configured to adapt a centrifugal clutch for use with a mud motor and a power take off (PTO) assembly, wherein the mud motor includes a body and a driving shaft, wherein the PTO assembly includes a PTO housing and a driven shaft, the clutch assembly comprising:
   a) the centrifugal clutch including:
      i) a hub configured to engage with the driving shaft of the mud motor,
      ii) a shoe containing a plurality of fly-weights and an elastic member coupled with the plurality of fly-weights, and
      iii) an outer drum casing adapted to selectively engage with the plurality of fly-weights when the driving shaft rotates at a first speed above a predetermined threshold; and
   b) a clutch housing configured to surround the centrifugal clutch and configured to be mounted to the body of the mud motor and the PTO housing,
   wherein the clutch housing includes:
      a base plate having inner mounting features that are radially disposed at a first distance from a longitudinal axis of the driving shaft of the mud motor, and outer mounting features that are radially disposed at a second distance from the longitudinal axis of the driving shaft of the mud motor, where the second distance is greater than the first distance, and
      a cup having inner mounting features on a PTO-facing side of the cup and outer mounting features on a motor-facing side of the cup,
   wherein the base plate is attachable to the body of the mud motor using inner mounting features of the base plate and corresponding fasteners,
   wherein the cup is attachable to the base plate using the outer mounting features of the base plate and the outer mounting features on the motor-facing side of the cup and corresponding fasteners,
   wherein the cup is attachable to the PTO housing using the inner mounting features on the PTO-facing side of the cup, and
   wherein the cup is adapted to be disposed around the centrifugal clutch when installed.

2. The clutch assembly according to claim 1, wherein the outer drum casing has a shaft fixed thereto that is adapted to engage with the driven shaft of the PTO assembly.

3. The clutch assembly according to claim 2, wherein the shaft fixed to the outer drum casing of the clutch has a diameter matching a diameter of the driving shaft of the mud motor.

4. The clutch assembly according to claim 3, wherein the shaft fixed to the outer drum casing of the clutch has a 15.875 millimeter (⅝ inch) diameter, a 19.05 mm (¾ inch) diameter, or a 25.4 mm (1 inch) diameter.

5. The clutch assembly according to claim 2, wherein the centrifugal clutch utilizes keyed or slotted connectors for the shaft of the outer drum casing when the mud motor is a first size or type of mud motor, or utilizes splined connectors for the shaft of the outer drum casing when the mud motor is a second size or type of mud motor that is different from the first size or type of mud motor.

6. The clutch assembly according to claim 2, wherein the plurality of fly-weights are adapted to engage with an inner surface of the outer drum casing, and the shaft of the outer drum casing is adapted to rotate the driven shaft of the PTO assembly when the driving shaft rotates at the first speed above the predetermined threshold.

7. The clutch assembly according to claim 6, wherein the plurality of fly-weights are adapted to disengage with the inner surface of the outer drum casing when the driving shaft rotates at a second speed that is below the predetermined threshold.

8. The clutch assembly according to claim 7, wherein the centrifugal clutch allows a propeller attached to the driven shaft of the PTO assembly to remain stationary while the mud motor is running at the second speed.

9. The clutch assembly according to claim 1,
wherein the centrifugal clutch and the clutch housing are installed between the body of the mud motor and the PTO housing,
wherein the outer drum casing of the clutch has a diameter which is larger than the mounting patterns on both the body of the mud motor and the PTO housing, respectively, and
wherein the outer drum casing of the clutch has a 114.3 millimeter (mm) (4.5 inch) diameter.

10. The clutch assembly according to claim 9, wherein an inner mounting pattern on a motor side of the clutch housing is a 63.5 mm (2.5") or 88.9 mm (3.5") square of a plurality of apertures corresponding to the mounting pattern around the driving shaft of the mud motor, and an inner mounting pattern on a PTO side of the clutch housing is a 63.5 mm (2.5") or 88.9 mm (3.5") square of a plurality of apertures corresponding to the mounting pattern around the driven shaft of the PTO housing.

11. A clutch assembly configured to adapt a centrifugal clutch for use with a mud motor and a power take off (PTO) assembly, wherein the mud motor includes a body and a driving shaft wherein the PTO assembly includes a PTO housing and a driven shaft, the clutch assembly comprising:
a) the centrifugal clutch including:
i) a hub configured to engage with the driving shaft of the mud motor,
ii) a shoe containing a plurality of fly-weights and an elastic member coupled with the plurality of fly-weights, and
iii) an outer drum casing adapted to selectively engage with the plurality of fly-weights when the driving shaft rotates at a first speed above a predetermined threshold; and
b) a clutch housing configured to surround the centrifugal clutch and configured to be mounted to the body of the mud motor and the PTO housing,
wherein the clutch housing comprises:
a first plate having inner mounting features that are radially disposed at a first distance from a longitudinal axis of the driving shaft of the mud motor, and outer mounting features that are radially disposed at a second distance from the longitudinal axis of the driving shaft of the mud motor, where the second distance is greater than the first distance,
a second plate having inner mounting features and outer mounting features, and
elongated spacer bolts adapted to attach the first plate and the second plate, and
spacer tubes adapted to slide over the spacer bolts and separate the first plate and the second plate,
wherein the first plate is attachable to the body of the mud motor using the inner mounting features of the first plate and corresponding fasteners,
wherein the second plate is attachable to the PTO housing using the inner mounting features of the second plate and corresponding fasteners, and
wherein the second plate is attachable to the first plate using the respective outer mounting features, the elongated spacer bolts, and the spacer tubes which are inserted onto the elongated spacer bolts between the first plate and the second plate to separate the second plate from the first plate and secure the first plate, the spacer tubes, and the second plate together.

12. The clutch assembly according to claim 11, wherein the clutch housing further comprises a cover configured to surround the centrifugal clutch within the clutch housing, and
wherein the cover is adapted to wrap around the spacer tubes and be secured between the first plate and the second plate when installed.

13. The clutch assembly according to claim 12, wherein the cover is a snap-on or clip-on type plastic safety cover having a width corresponding to a length of the spacer tubes, a curvature corresponding to a curvature of the outer drum casing of the clutch, one open side adapted for installing the cover, and detents that align with the outer mounting pattern of the first and second plates and are adapted to engage with the spacer tubes, respectively, when the cover is installed.

14. A system for integrating a centrifugal clutch for use with a mud motor, the system comprising:
a) a motor assembly including a body, a driving shaft, and mounting features disposed at a first radial distance from a longitudinal axis of the driving shaft;
b) a power take off (PTO) assembly including a PTO housing, a driven shaft, and mounting features disposed at the first radial distance from the longitudinal axis of the driving shaft; and
c) a clutch assembly adapted for installation between the motor assembly and the PTO assembly, wherein the clutch assembly includes:
i) the centrifugal clutch including a hub that is adapted to engage with the driving shaft of the motor assembly, a shoe containing a plurality of fly-weights and an elastic member coupled to the plurality of fly-weights, and an outer drum casing that is adapted to rotate when selectively engaged with the plurality of fly-weights when the driving shaft is rotated at a first speed above a predetermined threshold, and
ii) a clutch housing configured to surround the centrifugal clutch and allow the clutch to be installed between the body of the motor assembly and the PTO housing,
wherein the clutch housing includes:
a base plate with inner mounting features disposed at the first radial distance from the longitudinal axis of the driving shaft for attachment to the body of the motor assembly and outer mounting features disposed at a second radial distance from the longitudinal axis of the driving shaft that is greater than the first radial distance, and
a cup with the inner mounting features having the first radial distance at a first end for attachment to the PTO housing, and the outer mounting features having the second radial distance at a second end, wherein the cup and the base plate are attached together using the outer mounting features.

15. The system according to claim 14, wherein the outer drum casing of the clutch assembly has a shaft fixed thereto that is adapted to engage with the driven shaft of the PTO assembly.

16. The system according to claim 15, wherein the shaft fixed to the outer drum casing of the clutch assembly has a same diameter and/or connector type as the driving shaft of the motor assembly.

17. The system according to claim 14, wherein the outer drum casing of the clutch has a radius that is greater than the first radial distance of the mounting features of the motor assembly and the PTO assembly.

18. The system according to claim 14, wherein
in a case where the mud motor is a 0.735-2.207 kilowatt (KW) (1-3 horsepower (hp)) motor, the driving shaft of the motor assembly has a 15.875 millimeter (mm) (⅝ inch) diameter,
in a case where the mud motor is 2.207-5.148 KW (3-7 hp) motor, the driving shaft of the motor assembly has a 19.05 mm (¾ inch) diameter, or
in a case wherein the mud motor is an 5.884+kW (8+hp) motor, the driving shaft of the motor assembly has a 25.4 mm (1") diameter, and
wherein the shaft fixed to the outer drum casing of the clutch has a diameter matching a diameter of the driving shaft of the mud motor.

19. The system according to claim 14, wherein a mounting pattern around the driving shaft on the body of the motor assembly is a 63.5 mm or 88.9 mm (2.5 inch or 3.5 inch) square of a plurality of apertures for receiving corresponding fasteners, and a mounting pattern around the driven shaft of the PTO housing is a 63.5 mm or 88.9 mm (2.5 inch or 3.5 inch) square of a plurality of apertures for receiving corresponding fasteners.

20. The system according to claim 19,
wherein the centrifugal clutch and the clutch housing are installed between the body of the motor assembly and the PTO housing, and
wherein the outer drum casing of the clutch has a 114.3 mm (4.5 inch) diameter, which is larger than the mounting patterns on both the body of the motor assembly and the PTO housing, respectively.

21. The system according to claim 20, wherein an inner mounting pattern on a motor side of the clutch housing is a 63.5 mm (2.5 inch) or 88.9 mm (3.5 inch) square of a plurality of apertures corresponding to the mounting pattern around the driving shaft of the motor assembly, and an inner mounting pattern on a PTO side of the clutch housing is a 63.5 mm (2.5 inch) or 88.9 mm (3.5 inch) square of a plurality of apertures corresponding to the mounting pattern around the driven shaft of the PTO housing.

22. A system for integrating a centrifugal clutch for use with a mud motor, the system comprising:
   a) a motor assembly including a body, a driving shaft, and mounting features disposed at a first radial distance from a longitudinal axis of the driving shaft;
   b) a power take off (PTO) assembly including a PTO housing, a driven shaft, and mounting features disposed at the first radial distance from the longitudinal axis of the driving shaft; and
   c) a clutch assembly adapted for installation between the motor assembly and the PTO assembly, wherein the clutch assembly includes:
      i) the centrifugal clutch including a hub that is adapted to engage with the driving shaft of the motor assembly, a shoe containing a plurality of fly-weights and an elastic member coupled to the plurality of fly-weights, and an outer drum casing that is adapted to rotate when selectively engaged with the plurality of fly-weights when the driving shaft is rotated at a first speed above a predetermined threshold, and
      ii) a clutch housing configured to surround the centrifugal clutch and allow the clutch to be installed between the body of the motor assembly and the PTO housing, wherein the clutch housing includes a first plate and a second plate,
   wherein the first and second plates both include inner mounting features disposed at the first radial distance from the longitudinal axis of the driving shaft for attachment to the body of the motor assembly and the PTO housing, respectively, and outer mounting features disposed at a second radial distance from the longitudinal axis of the driving shaft that is greater than the first radial distance for attachment of the first and second plates via spacer bolts to secure together and separate the first and second plates.

* * * * *